United States Patent
Goldberg et al.

(10) Patent No.: US 10,567,312 B2
(45) Date of Patent: Feb. 18, 2020

(54) TECHNIQUES FOR MESSAGING BOT CONTROLS BASED ON MACHINE-LEARNING USER INTENT DETECTION

(71) Applicant: Facebook, Inc., Menlo Park, CA (US)

(72) Inventors: Jeremy Harrison Goldberg, San Francisco, CA (US); Sarah Hum, San Francisco, CA (US); Mikhail Larionov, Palo Alto, CA (US); Chih Shao Lee, Sunnyvale, CA (US); Lei Guang, Bellevue, WA (US); Zhisheng Huang, Sunnyvale, CA (US); Henri Romeo Liriani, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 124 days.

(21) Appl. No.: 15/371,159

(22) Filed: Dec. 6, 2016

(65) Prior Publication Data

US 2017/0295114 A1    Oct. 12, 2017

Related U.S. Application Data

(60) Provisional application No. 62/321,082, filed on Apr. 11, 2016, provisional application No. 62/320,869, filed on Apr. 11, 2016.

(51) Int. Cl.
*H04L 12/58* (2006.01)
*H04L 29/08* (2006.01)
*G06N 20/00* (2019.01)

(52) U.S. Cl.
CPC ............ *H04L 51/02* (2013.01); *G06N 20/00* (2019.01); *H04L 67/34* (2013.01)

(58) Field of Classification Search
CPC ....... H04L 51/02; H04L 67/306; H04L 67/34; H04W 4/12; H04W 4/50; G06N 99/005
See application file for complete search history.

(56) References Cited

U.S. PATENT DOCUMENTS 6,741,855 B1 * 5/2004 Martin .............. H04L 29/08846
                                                           455/412.1
7,979,501 B1   7/2011 Coleman et al.
(Continued)

FOREIGN PATENT DOCUMENTS

KR   10-2015-0037804        4/2015

OTHER PUBLICATIONS

International Search Report and Written Opinion received for PCT Patent Application No. PCT/US2016/019969, dated Nov. 21, 2016, 15 pages.

(Continued)

*Primary Examiner* — Davoud A Zand

(57) ABSTRACT

Techniques for messaging bot controls based on machine-learning user intent detection are described. In one embodiment, an apparatus may comprise a message queue monitoring component operative to monitor a messaging interaction, the messaging interaction exchanged via a messaging system, the messaging interaction involving at least one client device; an interaction processing component operative to determine a user intent for the messaging interaction; and a bot management component operative to determine a messaging bot options configuration for the client device based on the user intent; and send the messaging bot options configuration to the client device. Other embodiments are described and claimed.

16 Claims, 18 Drawing Sheets

(56) References Cited

U.S. PATENT DOCUMENTS

| | | | |
|---|---|---|---|
| 8,166,120 B2 | 4/2012 | Kunz et al. | |
| 8,428,777 B1 | 4/2013 | Poursohi et al. | |
| 8,539,361 B2 | 9/2013 | Hardy et al. | |
| 8,738,648 B2 | 5/2014 | Denenberg et al. | |
| 8,762,462 B1 | 6/2014 | Duddu et al. | |
| 8,769,414 B2 | 7/2014 | Tsuei | |
| 8,793,591 B1 | 7/2014 | Coleman et al. | |
| 8,886,390 B2 | 11/2014 | Wolfe et al. | |
| 9,411,506 B1 | 8/2016 | Prado et al. | |
| 9,450,901 B1* | 9/2016 | Smullen | H04L 51/046 |
| 9,491,281 B2 | 11/2016 | Kim et al. | |
| 9,628,575 B1 | 4/2017 | Lewis et al. | |
| 9,672,289 B1 | 6/2017 | Frind et al. | |
| 9,934,286 B2 | 4/2018 | Roth et al. | |
| 10,372,508 B2 | 8/2019 | Hosabettu et al. | |
| 10,412,030 B2 | 9/2019 | McGregor, Jr. et al. | |
| 2003/0200190 A1 | 10/2003 | Adar et al. | |
| 2005/0005249 A1 | 1/2005 | Hill et al. | |
| 2005/0050301 A1 | 3/2005 | Whittle et al. | |
| 2005/0222985 A1 | 10/2005 | Buchheit et al. | |
| 2006/0259555 A1 | 11/2006 | Hassounah et al. | |
| 2007/0157105 A1 | 7/2007 | Owens et al. | |
| 2007/0204308 A1 | 8/2007 | Nicholas et al. | |
| 2008/0086343 A1 | 4/2008 | Pendergraft et al. | |
| 2008/0089490 A1* | 4/2008 | Mikkonen | G06F 16/90 379/88.14 |
| 2008/0220877 A1 | 9/2008 | Guthrie | |
| 2008/0248788 A1 | 10/2008 | Smith et al. | |
| 2008/0250323 A1 | 10/2008 | Huff | |
| 2009/0254616 A1 | 10/2009 | Cheung et al. | |
| 2010/0274628 A1 | 10/2010 | Kunz et al. | |
| 2011/0179164 A1 | 7/2011 | Memon et al. | |
| 2011/0231499 A1 | 9/2011 | Stovicek et al. | |
| 2012/0011204 A1 | 1/2012 | Morin et al. | |
| 2013/0198296 A1 | 8/2013 | Roy et al. | |
| 2014/0136615 A1 | 5/2014 | Li | |
| 2014/0164953 A1 | 6/2014 | Lynch et al. | |
| 2014/0253666 A1* | 9/2014 | Ramachandran | H04W 4/12 348/14.06 |
| 2014/0256295 A1 | 9/2014 | Peng et al. | |
| 2015/0071418 A1 | 3/2015 | Shaffer et al. | |
| 2015/0172238 A1 | 6/2015 | Ahmed et al. | |
| 2015/0188869 A1 | 7/2015 | Gilad et al. | |
| 2015/0271118 A1 | 9/2015 | Nudel et al. | |
| 2016/0031081 A1 | 2/2016 | Johnson | |
| 2016/0044380 A1 | 2/2016 | Barrett | |
| 2016/0099892 A1* | 4/2016 | Palakovich | H04L 51/04 709/206 |
| 2016/0117384 A1 | 4/2016 | Akavaram et al. | |
| 2016/0132605 A1 | 5/2016 | Jiang | |
| 2016/0239547 A1 | 8/2016 | Lim et al. | |
| 2016/0247191 A1 | 8/2016 | Bhalla et al. | |
| 2016/0255082 A1 | 9/2016 | Rathod | |
| 2016/0261395 A1 | 9/2016 | Agarwal et al. | |
| 2016/0284005 A1* | 9/2016 | Daniel | G06Q 30/0631 |
| 2016/0284011 A1* | 9/2016 | Dong | G06Q 30/0631 |
| 2016/0285790 A1* | 9/2016 | Szeto | G06Q 30/0631 |
| 2016/0285816 A1* | 9/2016 | Schmid | G06Q 30/0631 |
| 2017/0005977 A1 | 1/2017 | Snabl | |
| 2017/0034085 A1 | 2/2017 | Bijor et al. | |
| 2017/0180276 A1 | 6/2017 | Gershony et al. | |
| 2017/0214647 A1 | 7/2017 | Shrivastava et al. | |
| 2017/0269972 A1 | 9/2017 | Hosabettu et al. | |
| 2017/0270431 A1 | 9/2017 | Hosabettu et al. | |
| 2017/0295114 A1 | 10/2017 | Goldberg et al. | |
| 2017/0329779 A1 | 11/2017 | Lewin-Eytan et al. | |
| 2018/0020067 A1 | 1/2018 | Sadanandan et al. | |
| 2018/0101533 A1 | 4/2018 | Robichaud | |
| 2018/0356961 A1 | 12/2018 | Lewis et al. | |

OTHER PUBLICATIONS

Mathsisfun.com, Linear Equations, pp. 1-3, Apr. 19, 2012.

* cited by examiner

TECHNIQUES FOR MESSAGING BOT CONTROLS BASED ON MACHINE-LEARNING USER INTENT DETECTION

RELATED APPLICATIONS

This application claims the benefit of priority under 35 U.S.C. § 119(e) to U.S. Provisional Patent Application No. 62/320,869, titled "Techniques to Respond to User Requests Using Natural-Language Machine Learning Based on Example Conversations,", filed on Apr. 11, 2016, which is hereby incorporated by reference in its entirety.

This application claims the benefit of priority under 35 U.S.C. § 119(e) to U.S. Provisional Patent Application No. 62/321,082, titled "Techniques for Messaging Agent Interactions,", filed on Apr. 11, 2016, which is hereby incorporated by reference in its entirety.

This application is related to U.S. patent application Ser. No. 15/350,004, titled "Techniques for Device Configuration for Commerce Messaging Using Commerce Messaging History Information,", filed on Nov. 11, 2016, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for messaging bot controls based on machine-learning user intent detection. Some embodiments are particularly directed to techniques for messaging bot controls based on machine-learning user intent detection, in which a messaging interaction is augmented with messaging bot options. In one embodiment, for example, an apparatus may comprise a message queue monitoring component operative to monitor a messaging interaction, the messaging interaction exchanged via a messaging system, the messaging interaction involving at least one client device; an interaction processing component operative to determine a user intent for the messaging interaction; and a bot management component operative to determine a messaging bot options configuration for the client device based on the user intent; and send the messaging bot options configuration to the client device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
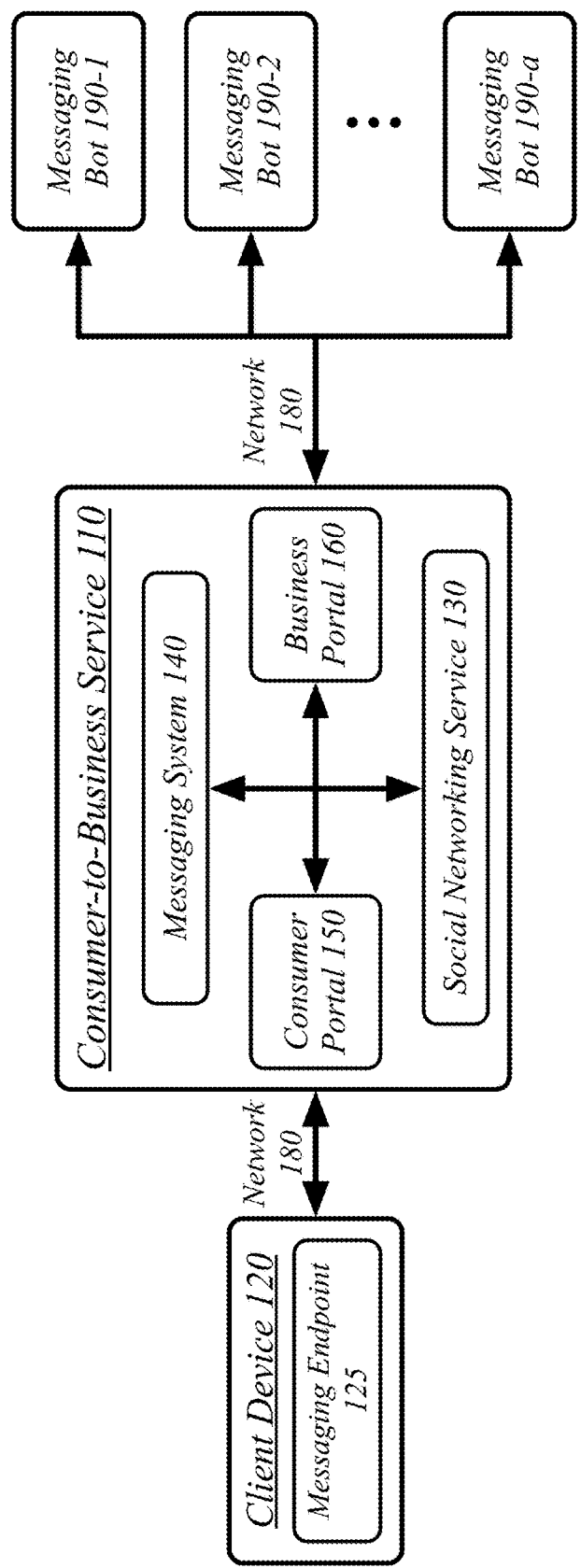
FIG. 1 illustrates an embodiment of a consumer-to-business messaging system.

Network-connected computing devices can provide their users with an unprecedented ability to engage in interpersonal communication. People may engage in messaging interactions with their friends, family, coworkers, and other associates. A user's message exchanges with their contacts may each be maintained within a distinct message thread.

These network-connected computing devices can also provide their users with access to network-accessible services. For instance, transportation services, dining services, entertainment services, and other services may use web sites, web applications, client applications, or other network-accessibility techniques to empower people to use their client devices to engage with their services. In some cases, such as some entertainment or media services, the service can be both arranged and delivered via the client devices.

For example, music may be purchased via a client device and delivered to the client device for playback. In other cases, such as with transportation, dining, and in-person entertainment, the service can be arranged via the client devices, but is performed external to the client device. For example, a ride-sharing service may be arranged via a client device but performed through a vehicle and driver providing ride sharing to the user.

In some cases, the use of a network-accessible service may relate to more than one person. Particularly where a user's access to the service is a client device that they also use for messaging, a user may benefit from sharing their engagement with the network-accessible service in the messaging client with the others to whom the service relates. As such, message threads may act as hubs for a user's online social relationship with their contacts, with the message threads incorporating services requested, monitored, or engaged with via the same client used for messaging.

To aid a user in interacting with a service via a messaging context, services may be represented as messaging bots within a messaging system. A messaging bot may be an automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between multiple users.

As such, a user may engage with network services within the familiar experience of a messaging client. Further, by using a messaging client, a user may engage with network services within a messaging context so as to allow the inclusion of other people. In some cases, this may simply inform the other people as to the services, such as letting friends or family know about transportation details. In other cases, this may empower the performance of services for multiple people, such as where dinner, a ride, entertainment, or other service is arranged for the use of multiple people. As a result, the embodiments can improve the experience of using network-accessible services and can extend the reach of network-accessible services to the user of a messaging system.

Therefore, users may engage with a business via a page in a social networking service using messaging communication, as they may be familiar with from chatting with friends. Users may discover, engage with, and purchase products and services from these businesses in the same messaging application they use for communicating with friends, colleagues, and other acquaintances.

Initially, users may be accustomed to interacting with a business via a web page. Even where this web page contains interactive or dynamic elements, the interaction is still received in the presentation style of a web page. Business pages, similar to web pages, may be accessible via a messaging system. However, where a web page may empower chatting via a pop-up dialog box, a messaging system may display a conversational interaction with a business in a messaging-specific interface. This may serve to ground the interaction in the presentation style of messaging, thereby humanizing and personalizing the experience. Further, as with messaging with another person, the messaging client may maintain a history of a conversation, allow navigation away from the conversation and returning, and a mirroring of the conversation across multiple user devices. In contrast, a pop-up messaging dialog on a web page is temporary, stuck to a browser window that cannot be closed until the conversation is completed, and rooted in a single user device. This conversation with a business page may be represented by a messaging bot, the messaging bot a virtual representation of the business page in a messaging environment. The messaging bot may function as an avatar for the business and unify the experience of messaging with a business within a single messaging representation.

Users may be suggested businesses with which to engage. These suggestions may be made within the context of a message thread between two or more users. As such, these suggestions may be made using techniques that control the amount of screen space used to display the suggestions. These suggestions may be controls that, when selected, instantiate a larger interface for the configuration of a service request with a messaging hot. This larger interface may be customized based on the context of a users conversation and the information known about one or more users. This customization may include the pre-selection of various user-customizable options and/or may include selecting a portion of a menu for a messaging hot. As a result, the embodiments can reduce the friction and clutter of integrating messaging bots into a message thread.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a consumer-to-business messaging system 100. In one embodiment, the consumer-to-business messaging system 100 may comprise a computer-implemented system having software applications comprising one or more components. Although the consumer-to-business messaging system 100 shown in FIG. 1 has a limited number of elements in a certain topology, it may be appreciated that the consumer-to-business messaging system 100 may include more or less elements in alternate topologies as desired for a given implementation.

A consumer-to-business service 110 may serve as an intermediary between consumers and businesses. Consumers and businesses may both be users of the consumer-to-business service 110, with consumers represented via an individual user account and businesses represented by a commerce account and, possibly, one or more individual user accounts associated with the business, such as individual user accounts associated with representatives and other employees of the business. A consumer user may be represented with a user entity in a social graph. A business or other commercial user may be represented by a business entity in a social graph. The relationship between the consumer user and the commercial user may be represented by one or more edges between the user entity and business entity in the social graph.

The consumer-to-business service 110 may comprise a messaging system 140. The messaging system 140 may be generally arranged to receive, store, and deliver messages between individual entities such as individual users and collective entities such as businesses and other organizations. The messaging system 140 may store messages while messaging endpoints, such as messaging endpoint 125, are offline and deliver the messages once the messaging endpoints are available. The messaging system 140 may empower a user to use multiple messaging endpoints (e.g., a messaging client on a mobile device, a web browser on a personal computer) for the same user account, with the messaging system 140 keeping all of the messaging endpoints up-to-date as to the messaging state of the user account.

The consumer-to-business service 110 may comprise a social networking service 130. The social networking service 130 may maintain a social graph data structure representing a social graph. The social graph may represent relationships between entities, such as user entities, commerce entities, and any other sort of entity. The social graph may represent the relationships as graph relationships, in which all information is encoded as either being attached to a particular node in the graph or attached to a particular edge between two nodes in the graph. A messaging system 140 may be an element of a social networking service 130, with the social graph containing, at least in part, social-networking information. The whole of the consumer-to-business service 110 may be an element or composed of elements of a social networking service.

The consumer-to-business service 110 may comprise a consumer portal 150. The consumer portal 150 may be a unified entry point into the consumer-to-business service 110 for client applications being used by consumers. The consumer portal 150 may serve as a general user portal for non-commerce entities, including users that are not or do not engage in commerce using the consumer-to-business service 110. The consumer portal 150 may provide access to the messaging system 140 and the social networking service 130. In some embodiments, all access to the social networking service 130 may be mediated by the consumer portal 150 in which the information of the social networking service 130 is used and managed on behalf of the user without the user having direct access to some or all of the social graph information. In some embodiments, the user may have direct access to the messaging system 140 using their user account, with the consumer portal 150 limited to consumer functions of the consumer-to-business service 110 with general messaging functionality (e.g., messaging with friends) provided through direct network communication between the messaging endpoint 125 and the messaging system 140 without the mediation of the consumer portal 150.

The consumer-to-business service 110 may comprise a business portal 160. The business portal 160 may be a unified entry point into the consumer-to-business service 110 for client application being used by business entities. The business portal 160 may provide access to the messaging system 140 and the social networking service 130. In some embodiments, all access to the social networking service 130 may be mediated by a business portal 160 in which the information of the social networking service 130 is used and managed on behalf of the business entity without the business entity having direct access to some or all of the social graph information. In some embodiments, the business entity may have direct access to the messaging system 140 using their commerce account, with the business portal 160 limited to business functions of the consumer-to-business service 110 with general messaging functionality (e.g., messaging with customers) provided through direct network communication between one or more messaging bots 190 and the messaging system 140 without the mediation of the business portal 160.

A user may participate in the consumer-to-business messaging system 100 and interact with the consumer-to-business service 110 using a messaging endpoint 125 software application executing on a client device 120. The client device 120 may typically be a smartphone—a mobile phone capable of executing software applications that provide functionality beyond that of a conventional telephone—such as an iPhone®, Android® phone, or other smartphone. The messaging endpoint 125 may be specifically associated with a particular messaging system 140 that forms part of the consumer-to-business service 110 or may be a general-purpose messaging client operative to interact with a plurality of messaging services. The messaging endpoint 125 may interact with one or both of the consumer portal 150 and the messaging system 140 for the performance of messaging tasks and commerce tasks.

A business entity may be represented in a messaging system by a commerce representation comprising a collection of information for display to a user. A commerce representation may comprise a business page, the business page being the identity of a business within the consumer-to-business messaging system 100. The business page may display information regarding a business entity. The business page may include information for the business entity, such as one or more of a physical location for the business entity, the operating hours of the physical location, or the hours in which the business entity (e.g., a representative of the business entity) is available for messaging through the consumer-to-business messaging system 100. The business page may include social-networking information for the business entity, such as a list of friends of a viewing user that have "liked" or "followed" the business entity within a social network as may be represented in a social graph.

A commerce representation may not correspond precisely to a business entity. A single business entity, such as a business, may have multiple commerce representations and therefore multiple business pages. For example, a single business may have different representations for different brands owned and operated by the same business. A retailer or reseller may sell multiple brands and may have different representations for different brands that they sell. A business may have different representations for different geographic areas in which they operate, such as one business page for the United States, another for Europe, another for Russia, etc.

To aid a user in interacting with a service within a messaging context, services may be represented as messaging bots 190 within a messaging system. A messaging bot may be a fully or partially automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between more than two users.

A messaging bot for a commerce representation may be presented in a messaging conversation in a messaging system 140. A user of the messaging system 140 may interact with a business by messaging with the messaging bot that comprises a virtual representation of the business. A messaging bot may specifically correspond to a commerce representation presented as a business page, with the messaging bot being the representation of the business page in a messaging context. Messaging with the bot may therefore extend the presence of a commerce representation from a business page, primarily dedicated to providing information from the business to users, to interactive messaging in which users and the business can engage in a conversation.

A business may use one or more commerce applications to engage with the messaging system 140. An application may correspond to a specific registration empowering access to the messaging system 140 and/or social networking service 130 via an application programming interface (API). An application may be registered with the messaging system 140 via various registered hooks for the application specifying how the application can be contacted by the messaging system 140. These hooks may be used to contact the application in response to events, such as user messaging, within the messaging system 140. An application may be assigned a secure token that may be used for authentication and the secure (e.g., encrypted) reception and sending of information with the messaging system 140. An application may correspond to a specific AppID with the messaging system 140 and/or social networking service 130. Because the business may surface multiple aspects of the services and products it provides via the agent, multiple different applications may be used by a business entity to interact with a user via the messaging system 140. Each application may be subscribed with the messaging system 140 to the one or more commerce representations, such as business pages, that it powers.

The network 180 may comprise any form of computer network operative to carry computer transmissions between computer devices. The network 180 may include one or both of intranets and the Internet. The network 180 may include cellular data and/or Wi-Fi data networks, such as may be used to provide connectivity to a mobile client device 120.

The consumer-to-business messaging system 100 may use knowledge generated from interactions between users. The consumer-to-business messaging system 100 may comprise a component of a social networking service 130 and may use knowledge generated from the broader interactions of the social networking service 130. As such, to protect the privacy of the users of the consumer-to-business messaging system 100 and the larger social networking service 130, consumer-to-business messaging system 100 may include an authorization server (or other suitable component(s)) that allows users to opt in to or opt out of having their actions logged by the consumer-to-business messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the consumer-to-business messaging system 100 and other elements of a social networking service 130 through blocking, data hashing, anonymization, or other suitable techniques as appropriate. For example, while interactions between users of a social networking service 130 and the social networking service 130 may be used to learn media content preferences and the relationship between preferences for different pieces of content, these interactions may be anonymized prior to or as part of the learning process.

Figure 2:
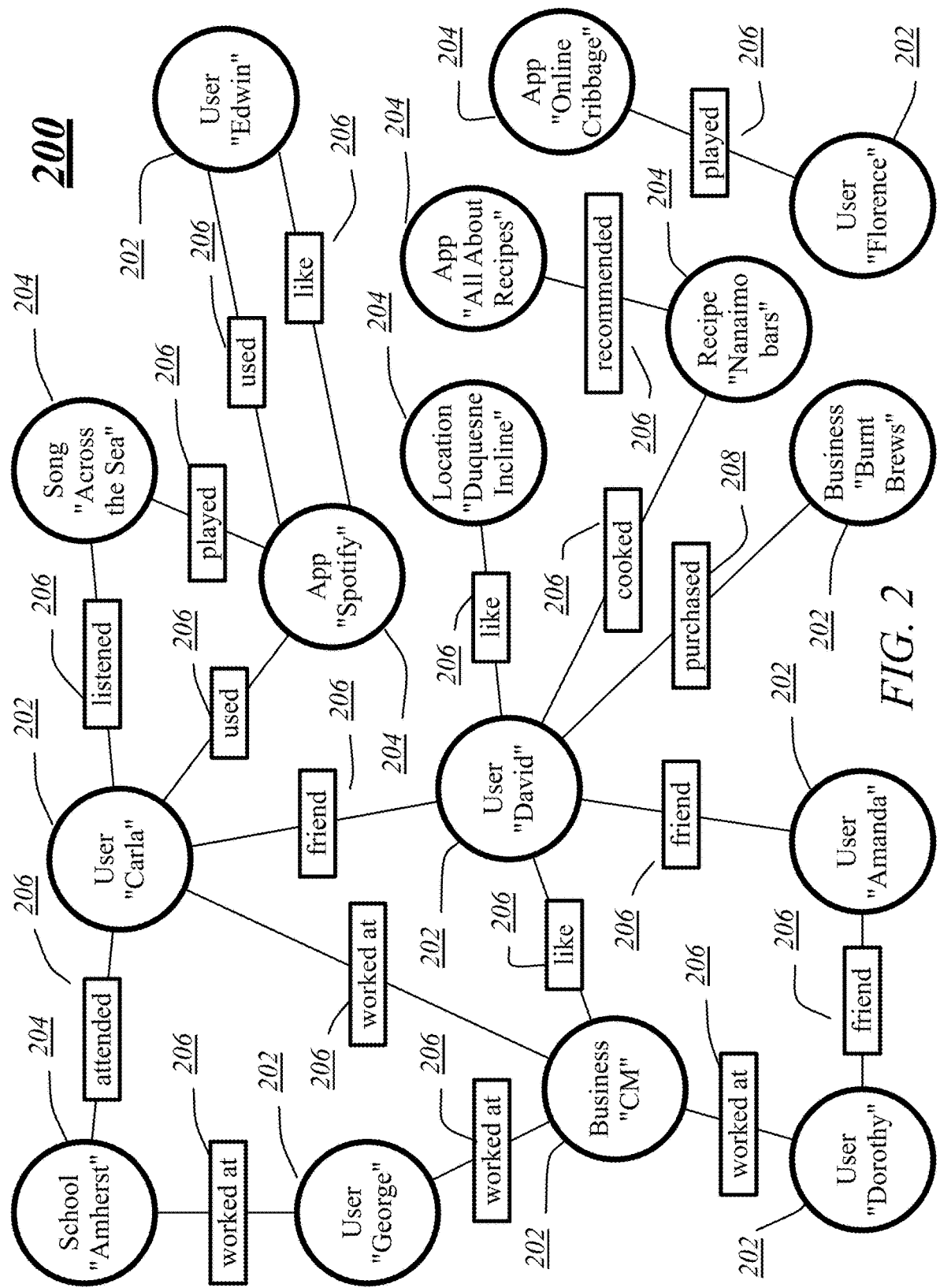
FIG. 2 illustrates an embodiment of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

Figure 3A:
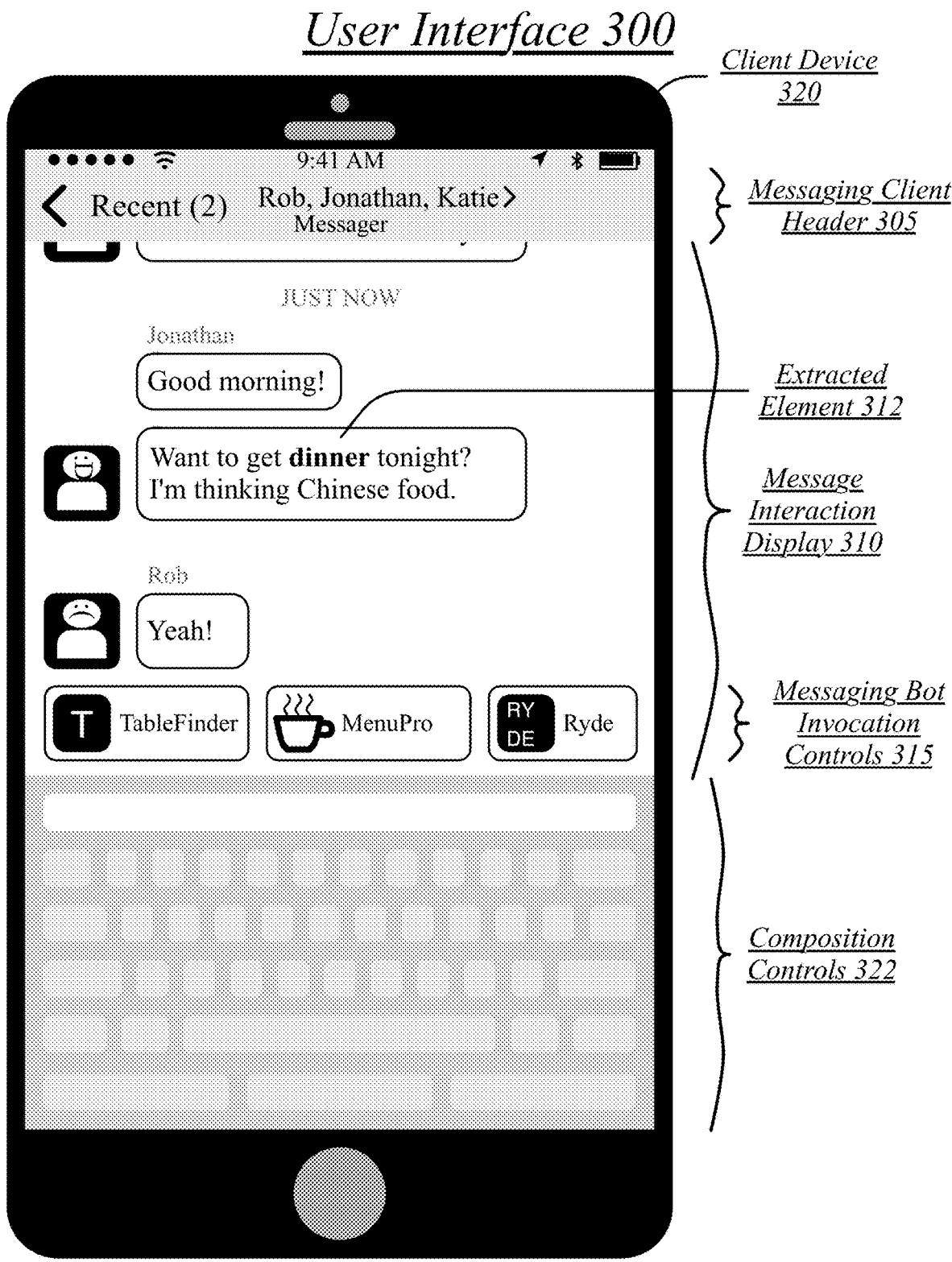
FIG. 3A illustrates a user interface with a message interaction display with messaging bot invocation controls.

FIG. 3A illustrates a user interface 300 with a message interaction display 310 with messaging bot invocation controls 315.

A client device 320 may correspond to any device used to access a consumer-to-business messaging system 100. While in the illustrated embodiment of FIG. 3A the client device 320 resembles a smartphone device, it will be appreciated that the techniques described herein may be used with any type of device. The user interface 300 may generally correspond to a display of a user inbox for the messaging system 140.

A messaging client may display a messaging client header 305. The messaging client header 305 may comprise a title for a message thread, such as the name of one or more users participating in the message thread, which may be selected according to real name, nick names, or other name information. The messaging client header 305 may comprise a control to return a user to an inbox view for the messaging client. An inbox view control may be augmented with a number of recent message threads with unread messages.

The user interface 300 for a message thread may include composition controls 322. Many, most, or nearly all of the composition controls 322 may empower access to and use of interface controls for the performance of various tasks, such as text entry, media selection, emoji selection, camera use, a social approval icon, etc. The controls may include text entry controls empowering the entering of text for the composition of text-based messages. The controls may include hardware controls. In some embodiments, controls may be touchscreen-based controls.

The user interface 300 for the message thread may comprise a message interaction display 310. The message interaction display 310 may comprise the messages exchanged within the message thread. The message interaction display 310 may be iteratively updated as additional messages are added to the message thread by the participants in the message thread. Messages may be displayed in association with an avatar for the user.

A messaging client and/or messaging system 140 may detect an element for use in selecting and configuring one or more messaging bots. An extracted element 312 may generally correspond to a word, phrase, or other element of a message thread that a messaging system 140 associates with a potential action, option, or other suggestion. The messaging system 140 using an extracted element 312 may invoke suggested services, such as suggested messaging bots, related to the extracted element 312. Elements for extraction may be determined based on predetermined and pre-assigned associations between words and/or phrases and various suggestions, or may be automatically determined based on natural language programming techniques.

The extracted element 312, or any other content or context of a message thread, may invoke the display of messaging bot invocation controls 315. The messaging client may retrieve and display a plurality of suggested services, such as may correspond to suggests messaging bots, in a plurality of triggered messaging bot invocation controls 315. In some embodiments, the plurality of suggested services may be automatically displayed on response to the messaging client and/or messaging system 140 detecting a relevant context, such as based on an extracted element 312 or a plurality of extracted elements. The messaging bot invocation controls 315 may comprise a plurality of messaging bot options. A messaging bot invocation control may comprise a particular messaging bot associated with a particular service.

The messaging bot invocation controls 315 may comprise suggestions for services, as may be represented by messaging bots. The messaging bot invocation controls 315 may comprise a ranked list of suggested messaging bots. Suggested messaging bots may be determined based on a variety of techniques and based on a variety of factors. Suggested messaging bots may be selected and ranked based on the location of the user(s) in the thread. Messaging bots that relate to activities that have previously been associated with a user's current geographic location may similarly be selected or ranked higher, such as suggesting restaurant-related messaging bots when a couple are messaging each other while both are at their place of employment. The ranking of the suggested messaging bots may be represented in the ordering of the messaging bot invocation controls 315, with higher-ranked messaging bots displayed more prominently and lower-ranked messaging bots displayed less prominently. For instance, some lower-ranked messaging bots may be arranged such that they are completely or partially off-screen and only revealed (or fully revealed) if the user navigations through the messaging bot invocation controls 315.

Suggested messaging bots may be selected and ranked based on associations between one or more detected keywords or intents and the messaging bots. A keyword may correspond to a word or phrase extracted from the contents of a messaging interaction. The messaging system 140 may have a registry of relevant keywords and may examine the contents of messaging interactions to identify and extract those keywords as a basis for selecting and ranking messaging bots. For example, a mention of "ride" or "transport" may prompt the suggestion of transportation-related service or a higher ranking for transportation-related services. An intent may comprise a keyword, concept, phrase, or other identifier generated based on the context of a messaging interaction distinct from merely extracting a word or phrase from the messaging interaction. The messaging system 140 may have a registry of intents and may perform natural language processing on the contents of a messaging interaction to determine intents inferred by the messaging interaction. For example, a mention of multiple specific movies may imply the intent keyword "movie" without a specific use of the word "movie." In another example, a person-to-person inquiry regarding whether they "want to go see something" could imply an interest in movies without the direct use of the word "movie." As such, the messaging system 140 may generate an intent for a messaging interaction that includes words or phrases not used in the messaging interaction.

Keywords and/or intent may be extracted from the content, or a portion of the content, of the messaging interaction embodied in a message thread. In some cases, a recent portion of the message thread may be used, such as by detecting a current period of engagement with the message thread and extracting keywords and/or intent from the message thread for that current period. The recent portion of a message thread may be defined according to a variety of techniques. In some cases, the recent portion may be defined according to a predefined length of time, with the recent portion being the segment of the thread exchanged during an extent of time spanning a length equal to the predefined length of time and concluding at the current time. In some cases, the recent portion may be determined as spanning a variable length, such as by detecting the most recent break in conversation of sufficient length, which may be predefined, to indicate temporary disengagement with the message thread. For example, the recent portion of the message thread may be the maximum extent of the thread concluding at the current time that does not include any gap in conversation longer than one hour. Other techniques for defining a recent portion of a thread may be used. This recent portion of the message thread may be analyzed to determine one or more keywords, which may comprise one or more explicit keywords explicitly used within the message thread and which may comprise one or more intent keywords inferred from the message thread based on natural language processing techniques.

Keywords, whether explicitly extracted or derived from intent, may be used to determine one or more services that may be of interest to the user(s) in the message thread. The messaging bot invocation controls 315 may comprise a selection of messaging bots corresponding to one or more providers for the one or more services. For instance, keywords related to "dinner" and "food" may be extracted or inferred. A plurality of providers related to dinning may be selected, such as a reservation-procurement service and a menu-listing service. Related services may also be selected, such as a ride-sharing service for transportation to a restaurant. The plurality of providers for each of the plurality of services may be joined together into a plurality of combined providers representing the plurality of services detected as being of possible interne to the user(s) in the message thread. This plurality of combined providers, and their associated messaging bots, may then be ranked according to a variety of factors, including location, level of detected interest in the services provided by the providers, level of detected interest in the specific providers, previous history of requesting various services either globally for the one or more user(s) or specifically within the message thread, previous history of using various providers either globally for the one or more user(s) or specifically within the message thread, or according to any other relevant factor.

In some embodiments, where multiple services are to be offered, the ranking of the corresponding providers may be constructed so as to showcase the variety of services being offered. For instance, a highest-ranked provider for each service may be selected and offered as the top-listed provider (and therefore a top-listed associated messaging bot) prior to a second provider for any of the services. The highest-ranked provider for each service may be ranked according to predicted interest in the service in general and/or based on the predicted interest in the provider specifically, such as may be determined according to various factors described herein.

Selecting a messaging bot invocation control of the plurality of messaging bot invocation controls 315 may invoke an interface for interaction with that particular selected messaging bot.

In some embodiments, a message thread may be a multi-user message thread in which multiple participants engage in a message interaction. However, in an alternative embodiment, the message thread may be a bot-request thread in which a user engages directly and purposefully with a system that can recommend and guide the user to various messaging bots. A user may select a bot-request thread from a list of bots, engage with a bot-request engine to receive recommended bots, and then engage with the bots in the bot-request thread. For example, rather than asking "Want to get dinner tonight? I'm thinking Chinese food." a user might submit "I'd like to get dinner tonight and am thinking Chinese food." in the bot-request thread, with the bot-request system determining the user intent and recommending messaging bots to the user. The messaging bot invocation controls 315 may then be presented, not as a response to the detection of an opportunity for recommendations implicit in a user-to-user interaction, but instead as a response to a direct query by the user.

In another alternative embodiment, a request for assistance from a messaging bot may be directly invoked within a user-to-user message thread. A bot request may be made by directly addressing the bot-suggestion system. Directly addressing the bot-suggestion system may be performed using a variety of techniques. For instance, the bot-suggestions system may be addressed by prefixing a text-based request with a text segment indicating that the bot-suggestion system is being addressed. For example, a user might enter "@M I'd like to get dinner tonight and am thinking Chinese food," with the "@M" text segment invoking the bot-suggestion system. Alternatively or additionally, a control may be provided as part of the composition controls 322 empowering addressing of the bot-suggestion system with the user-to-user message thread. In some embodiments, where the bot-suggestion system is directly invoked, the invocation of the bot-suggestion system, any responses by the bot-suggestion system (such as messaging bot invocation controls 315 or other responses), or interactions with the messaging bot may only be shown to the user of the client device 320 that invokes the bot-suggestion system and any bots, with the messaging system 140 refraining from providing these interactions to other client devices. This creates a side-conversation within a user-to-user message thread between the invoking user and the bot-suggestion system and messaging bots that is private from any other participants in the thread. However, in other embodiments, other client devices, and therefore their users, may be provided some or all of these interactions.

Figure 3B:
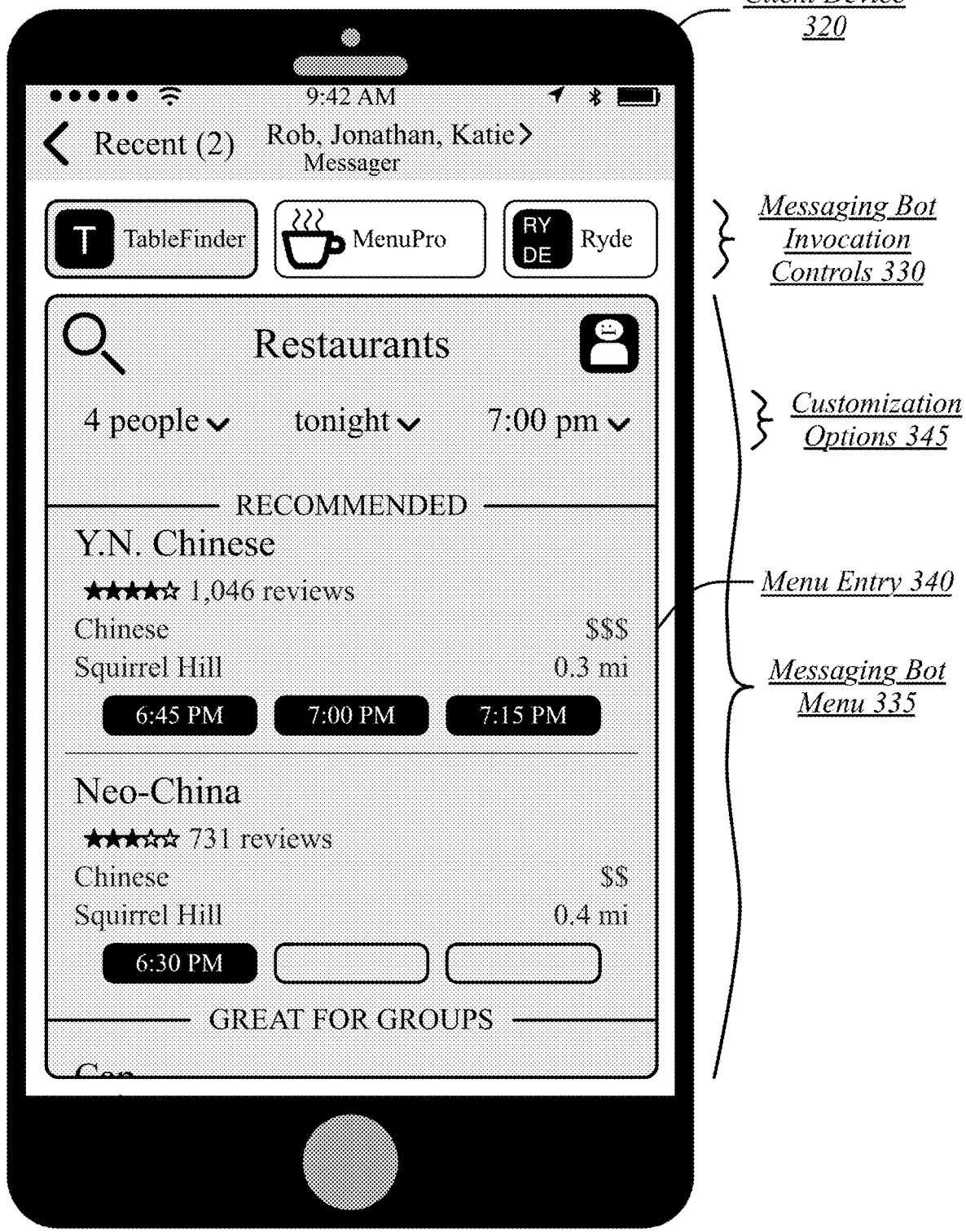
FIG. 3B illustrates a user interface with a messaging bot menu.

FIG. 3B illustrates a user interface 325 with a messaging bot menu 335.

A messaging bot menu 335 for a particular messaging bot may be displayed in response to a messaging bot invocation control for that messaging bot being selected by a user of a client device 320. The messaging bot menu 335 may be displayed in association with the messaging thread from which it is invoked.

The messaging bot menu 335 is a display element specifically associated with a particular messaging bot and empowers a user to interact with an interface for the messaging bot within the context of the message thread from which it is invoked. The user of the client device 320 may move into the messaging bot menu 335, interact with the messaging bot menu 335 to interact with the messaging bot, back out of the messaging bot menu 335 to re-engage with the messaging conversation in the message thread, move back into the messaging bot menu 335 to re-engage with the messaging bot, move between different messaging bot menus, and generally dynamically interact with messaging bot menus within the context of the message thread so as to select and interact with a messaging bot while retaining a connection to an ongoing messaging conversation.

Messaging bot invocation controls 330 may be displayed adjacent to the messaging bot menu 335. The messaging bot invocation controls 330 may be substantially similar to the messaging bot invocation controls 315 displayed adjacent to a messaging conversation, but relocated to a top portion of the screen of the client device 320. The relocated messaging bot invocation controls 330 may be tabs for selecting between the various messaging bot menus. As such, selecting a currently-unselected messaging bot invocation control may transition the messaging client to display the messaging bot menu for the now-selected messaging bot invocation control. The particular messaging bot invocation control associated with the current messaging bot menu 335 may be displayed with a distinct visual style, so as to indicate that the messaging bot for that messaging bot invocation control currently has the active messaging bot menu 335. Re-selecting the control for the currently-active messaging bot menu 335 may minimize the messaging bot menu 335 to empower the user to return to the view of the messaging bot conversation in a messaging interaction display 310.

The messaging bot menu 335 may comprise a plurality of customization options 345. These customization options 345 comprise settings configuring a messaging bot as set by controls for the messaging bot provided as part of the messaging bot menu 335. Customization options 345 may be initially set automatically based on the context of the message thread, based on the content of the specific messaging interaction prompting the display of the messaging bot invocation controls 315, based on user information for the message thread and/or the specific messaging interaction, and/or according to other analysis of the context of the messaging bot menu 335. These customization options 345 may then be retained by the user or modified using the controls of the messaging bot menu 335.

In general, the messaging bot menu 335 is configured based on the customization options 345, whether customization options 345 set automatically or set manually by the user of the client device 320. In some instances, a messaging bot menu 335 may include one or more menu entries. For example, for a messaging bot menu 335 designed for configuring, displaying, and selecting restaurant recommendations, a menu entry 340 may correspond to a particular restaurant. A menu entry 340 may include a name, location, pricing information, performance information, and other information relating to the menu entry 340. A menu entry 340 may include one or more controls. For example, a control for a restaurant menu may empower the selection of both a restaurant and a particular available reservation time for the restaurant. In these instances, the menu entries are determined at least in part based on the customization options 345. The menu entries may also be determined in part on additional information, such as information relating to a message thread or participants in a message thread.

Figure 3C:
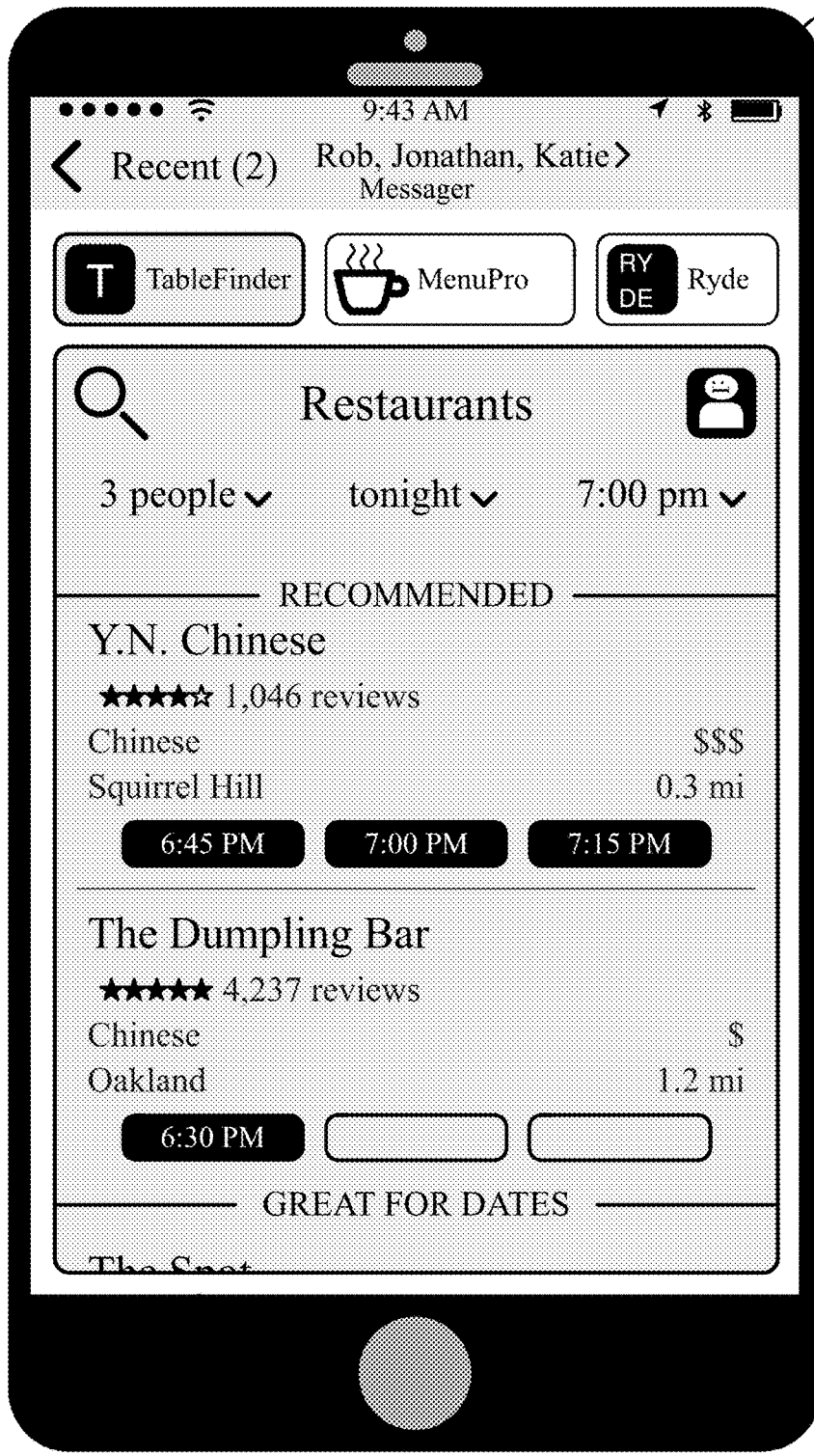
FIG. 3C illustrate a user interface for an updated messaging bot menu with updated customization options.

FIG. 3C illustrate a user interface 350 for an updated messaging bot menu 360 with updated customization options 370.

An updated messaging bot menu 360 is generated to replace a previous messaging bot menu 335 when a user configures updated customization options 370. In some cases, at least a portion of the automatically-configured customization options 345 may differ from a user's preferences. For example, the messaging system 140 may inform the messaging bot as to a number of participants in a message thread, which may effect an automatically-configured number of people set as a customization option equal to the number of participants. However, a user may determine that a lesser number of people (e.g., only a portion of the messaging participants) or greater number of people (e.g., including additional people) should be included and generate updated customization options 370. More generally, any customization options may be modified to generate updated customization options 370. These updated customization options 370 may be provided to the messaging bot to generate an updated messaging bot menu 360 reflecting the updated customization options 370. An updated messaging bot menu 360 may include modified menu entries, such as recommendations. However, in some cases, the menu entries may remain the same, with the updated customization options 370 being retained and used to configure a requested service, such as where the same menu entries are shown independent of the number of people a restaurant reservation would be for.

Figure 3D:
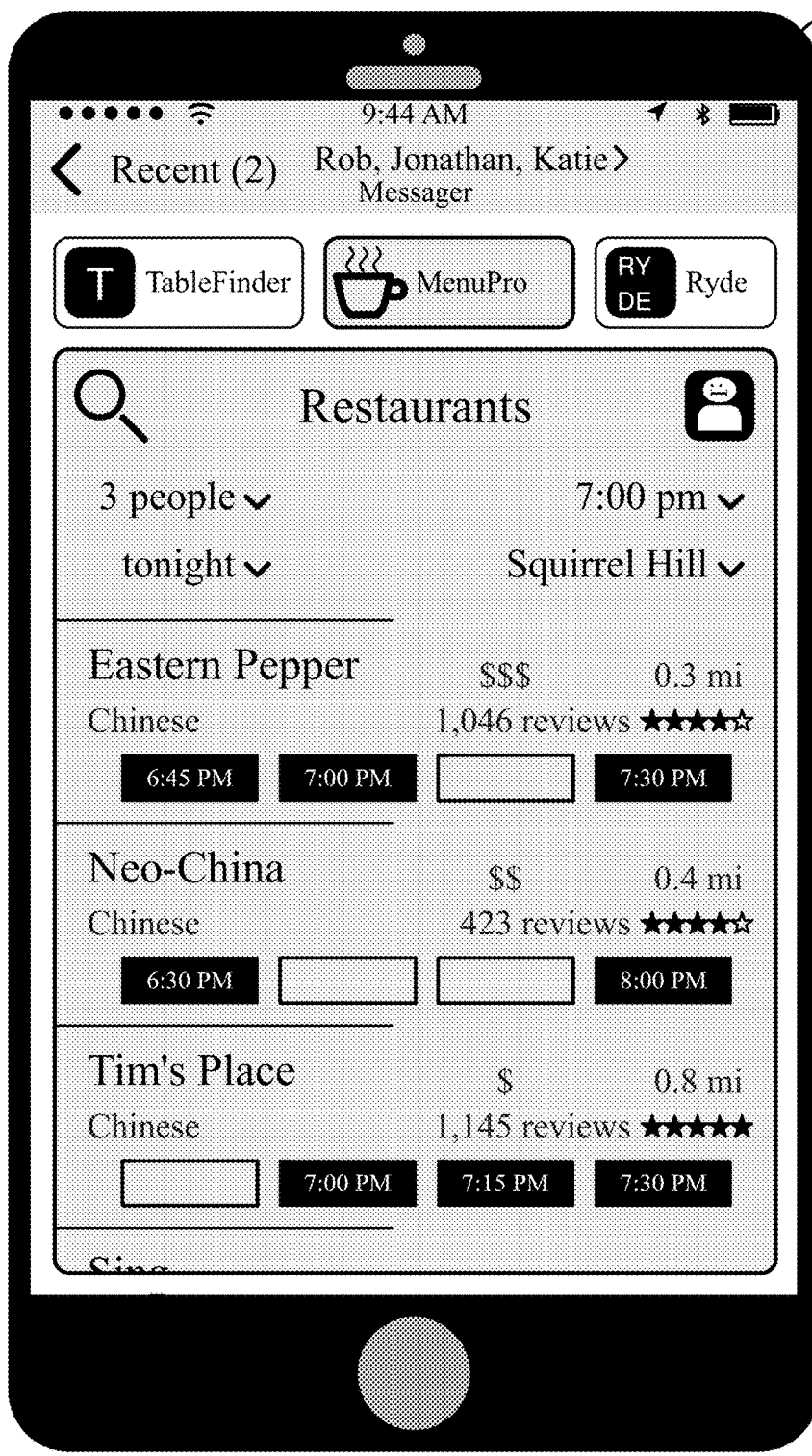
FIG. 3D illustrate a user interface for a messaging bot menu for a different messaging bot with customization options carried over between messaging bots.

FIG. 3D illustrate a user interface 375 for a messaging bot menu 380 for a different messaging bot with customization options 385 carried over between messaging bots.

The illustrated embodiment of FIG. 3D may correspond to a user having selected a different messaging bot invocation control of the plurality of messaging bot invocation controls 330: a different messaging bot invocation control than a currently-selected control. This will transition the distinct visual style indicating which indicates the currently-active messaging bot to the now-selected messaging bot.

A replacement messaging bot menu 380 replaces the previous messaging bot menu 360 with messaging bot content related to the now-selected messaging bot. This messaging bot menu 380 may also contain customization options 385 for configuring the now-selected messaging bot. These customization options 385 may be set based on not only the message thread and message participant information, but also any user modifications made to the previous customization options. For instance, when a user generates updated customization options 370, any changes represented in the updated customization options 370 are carried over to the customization options 385 for the replacement messaging bot menu 380. The messaging system 140 records the user-specified customization options and provides them to the replacement messaging bot as customization options 385 for use with the replacement messaging bot. This may serve as a convenience to the user of the client device 320 by eliminating a duplicate setting of a particular setting for the customization options for the replacement messaging bot menu 380 that was already set in the previous messaging bot menu 360.

Figure 4A:
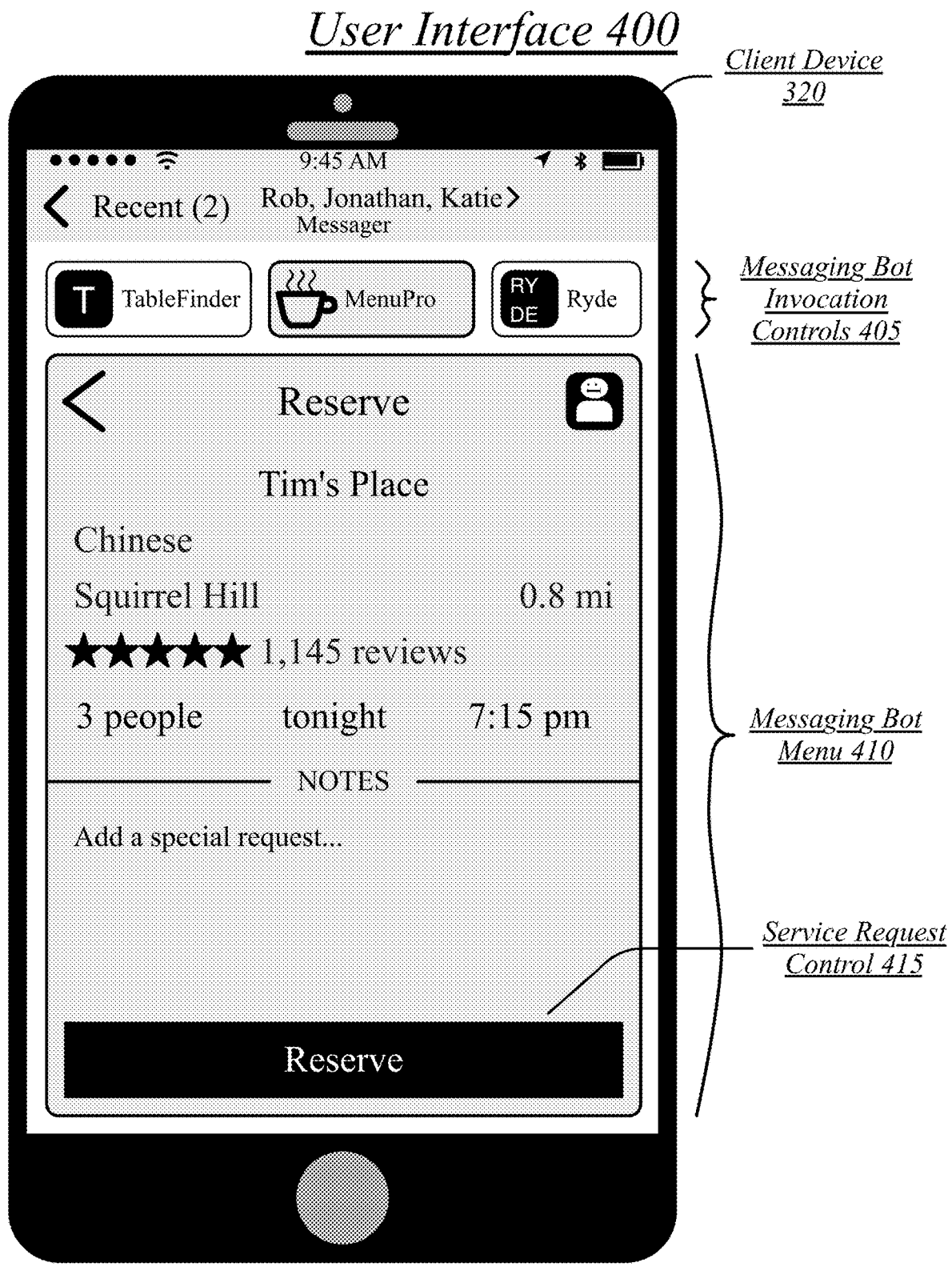
FIG. 4A illustrates a user interface for a messaging bot menu for a configured service request.

FIG. 4A illustrates a user interface 400 for a messaging bot menu 410 for a configured service request. A messaging bot menu 410 may advance to a point where a service request has been sufficiently configured as to allow a service request. Once the messaging bot menu 410 has reached this state, a service request control 415 may be displayed. However, in some cases, a user may select the messaging bot invocation control for the current messaging bot menu 410 and minimize the messaging bot menu 410 in order to engage with the messaging interaction of a message thread.

Figure 4B:
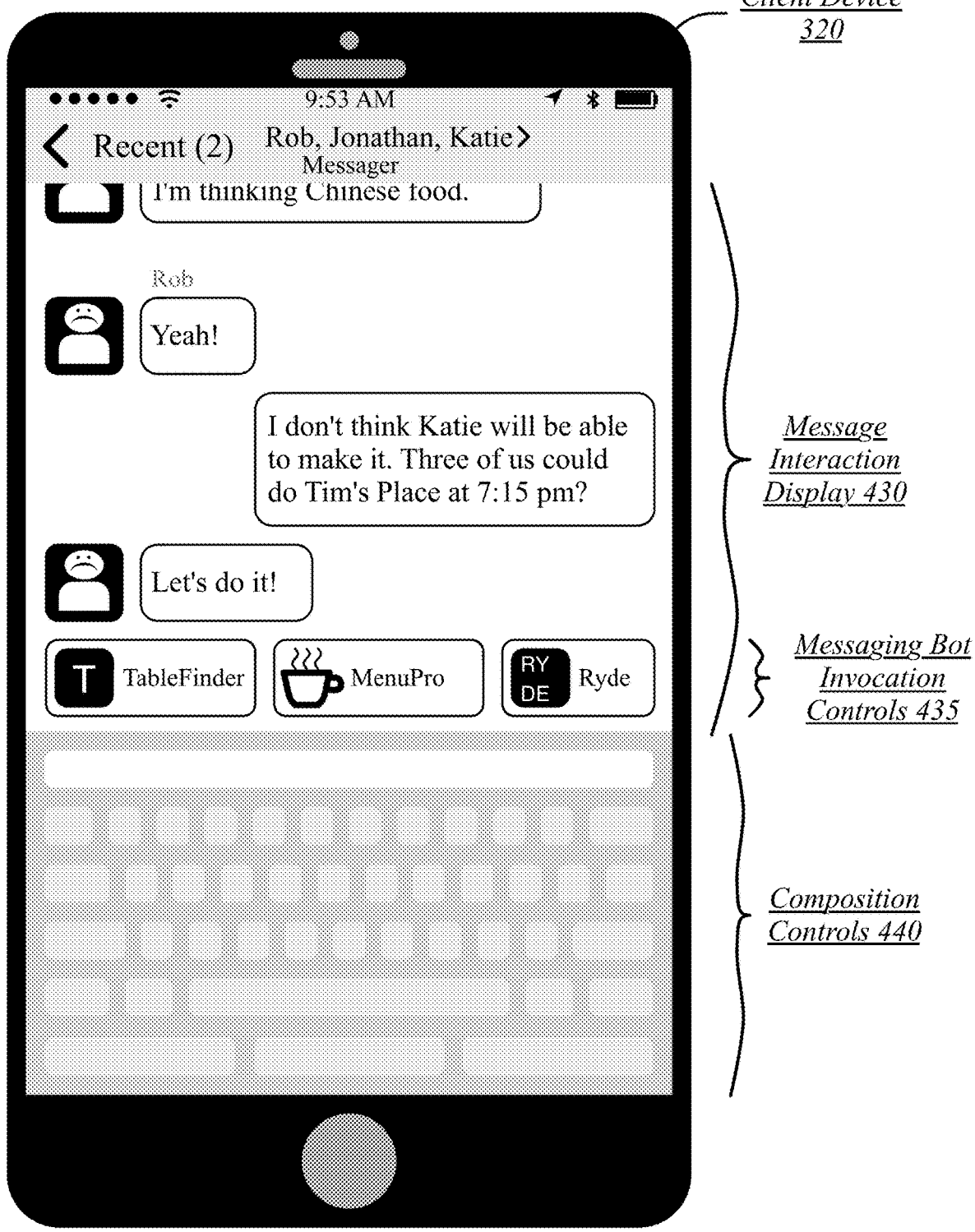
FIG. 4B illustrates a user interface for a message interaction display with persistent messaging bot invocation controls.

FIG. 4B illustrates a user interface 425 for a message interaction display 430 with persistent messaging bot invocation controls 435. FIG. 4B may correspond to the state of the client device 320 after a user has selected a messaging bot invocation control for a current messaging bot menu and minimized the messaging bot menu in order to engage with the messaging interaction of a message thread via a message interaction display 430. The messaging interaction display 430 may include the messaging bot invocation controls 435 to empower a return to the messaging bot menus. The composition controls 440 may be returned to empower engagement with the messaging interaction.

Figure 4C:
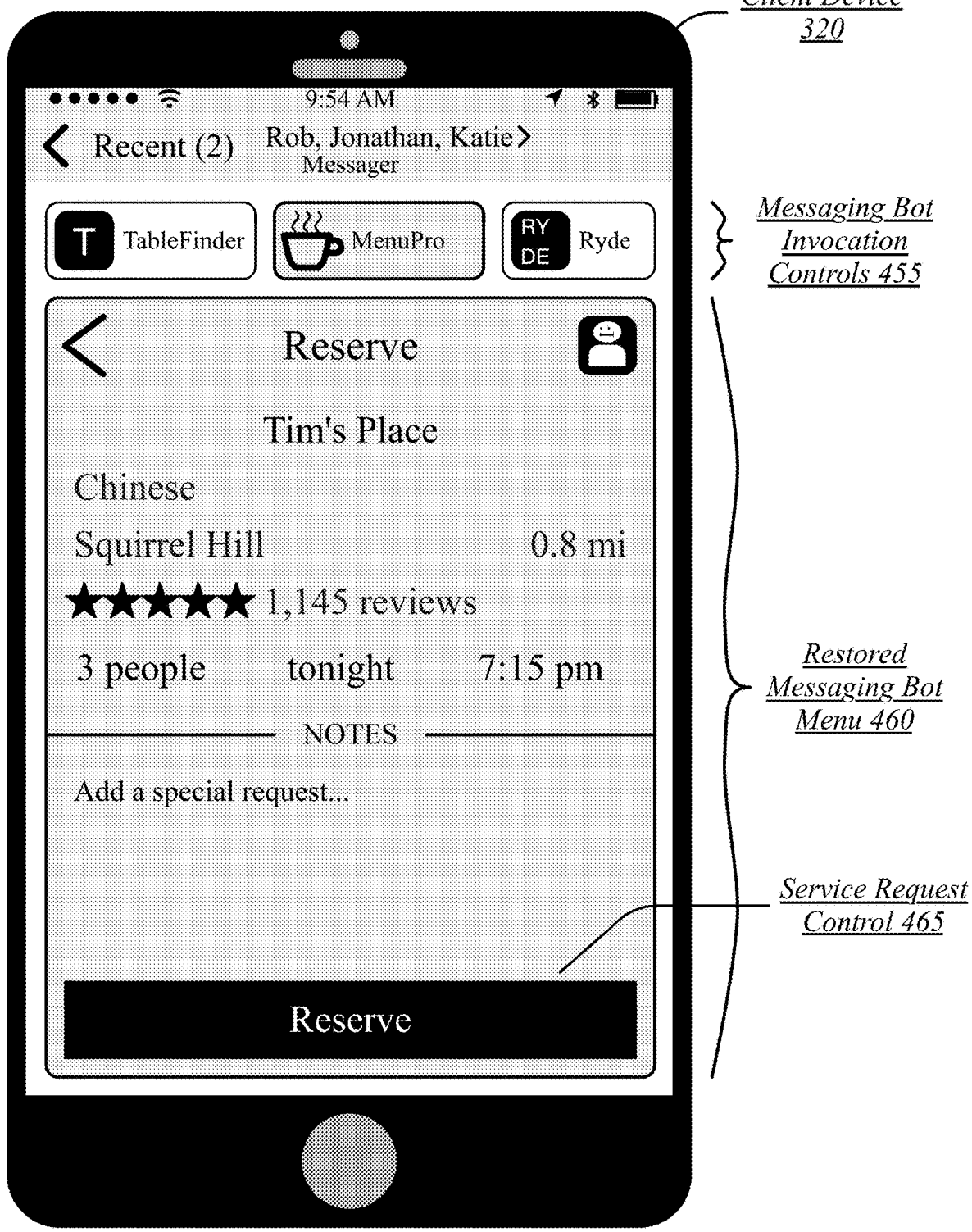
FIG. 4C illustrates a user interface with a restored messaging bot menu.

FIG. 4C illustrates a user interface 450 with a restored messaging bot menu 460. The restored messaging bot menu 460 restores a user's place in a messaging bot menu that was configured and then minimized through the messaging bot invocation controls 455. The restored messaging bot menu 460 may be retrieved by selecting the messaging bot in a displayed set of the messaging bot invocation controls 455. A service request control 415 may be displayed as part of the restored messaging bot menu 460. Any state of a restored messaging bot menu 460 may be saved on the client device 320 and then retrieved when a messaging bot invocation control with an associated save messaging bot menu is selected.

Figure 4D:
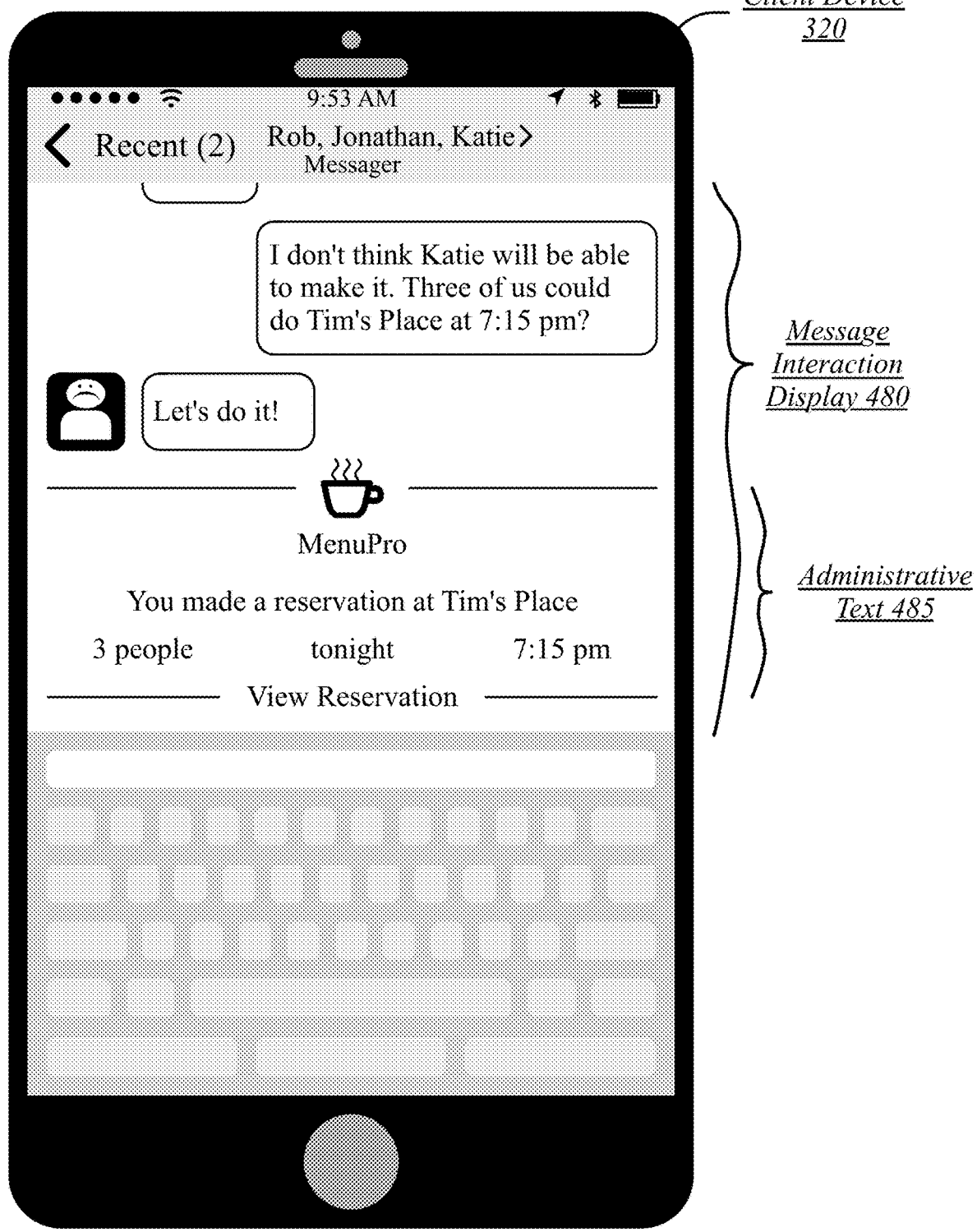
FIG. 4D illustrates a user interface with a message interaction display with administrative text communication a service request.
Figure 5:
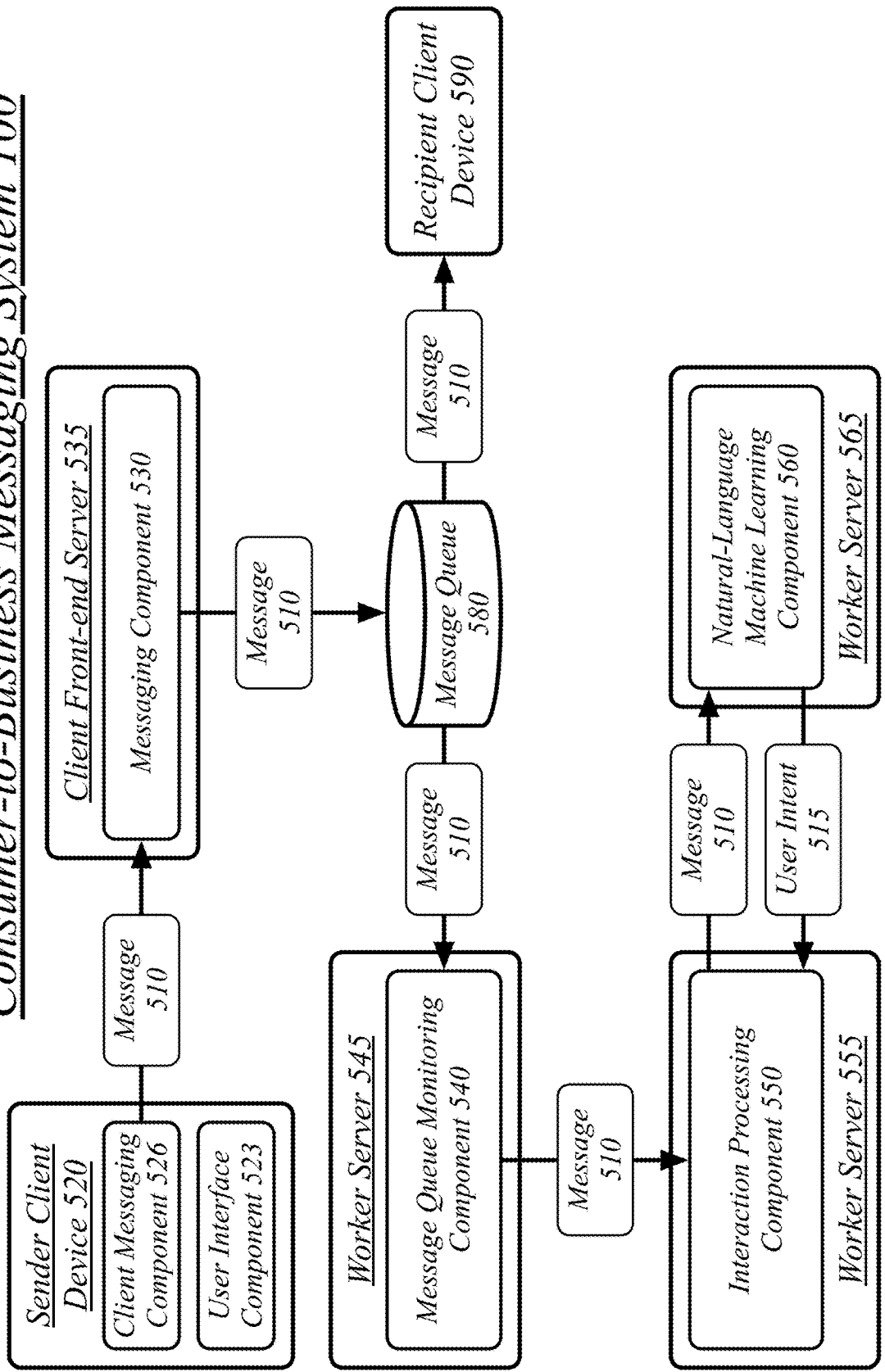
FIG. 5 illustrates a determination of a user intent based on a messaging interaction.

FIG. 4D illustrates a user interface 475 with a message interaction display 480 with administrative text 485 communication a service request. Once a user has selected a service request control 415, or otherwise requested a service from a messaging bot, the messaging bot may provide administrative text 485 to the messaging system 140, the administrative text 485 communicating the configured service. The administrative text 485 is then provided by the messaging system 140 to the client device 320 for display as part of the messaging interaction display 480. The administrative text 485 may also be distributed to other client devices belonging to the user and to client devices associated with other participants in the message thread. The administrative text 485 may include text, images, controls, or any other element. The administrative text 485 may be customized based on the viewer. For example, the administrative text may identify the user requesting a service differently to that user and to other users FIG. 5 illustrates a determination of a user intent based on a messaging interaction.

A messaging system 140 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers through network communication. For example, the messaging client transmitting or receiving messages to or from a client front-end server 535 may be interpreted as using the network interface controller for network access to a communications network for the transmission or reception of information.

A messaging client may comprise a user interface component 523. A user interface component 523 may be generally arranged to display user interfaces to a user of a client device and to receive user commands for the messaging client for the client device. A messaging client may comprise a client messaging component 526. A client messaging component 526 may be generally arranged to conduct messaging interactions on the behalf of the messaging client via communication with the client front-end server 535.

A client front-end server 535 may be generally arranged to act as a network access point to the messaging system 140 for client devices such as sender client device 520. The client front-end server 535 may comprise a messaging component 530, the messaging component 530 generally arranged to act as a network access point to messaging services for the messaging system 140. The messaging component 530 may receive messages from client devices and add the messages to message queues.

A message queue 580 may be specifically associated with the user of sender client device 520, such as by being uniquely associated within the messaging system 140 with a user account for the user of sender client device 520. The message queue 580 may be a single queue used for all messaging endpoints used by this user. The message queue 580 may comprise a representation of updates in a strict linear order. The message queue 580 may be organized as a data unit according to a variety of techniques. The message queue 580 may be stored in semi-persistent memory, persistent storage, both semi-persistent memory and persistent storage, or a combination of the two. The message queue 580 may be organized according to a variety of data structures, including linked lists, arrays, and other techniques for organizing queues. The message queue 580 may generally comprise a first-in-first-out (FIFO) queue in which no update will be removed or retrieved from the queue before any updates that were received prior to it.

The messaging system 140 may comprise one or more worker servers, such as worker servers 545, 555, 565. In general, the messaging system 140 may comprise a plurality of worker servers that may be assigned to various tasks. A worker server 545 may comprise a message queue monitoring component 540, the message queue monitoring component 540 arranged to monitor updates, such as may comprise messages, in the message queue 580 and other message queues of the messaging system 140 for various flags, indicators, and other information. A worker server 55 may comprise an interaction processing component 550, the interaction processing component 550 operative to manage the generation of a user intent 515 based on the contents of a messaging interaction. A worker server 565 may comprise a natural-language machine learning component 560, the natural-language machine learning component 560 operative to use natural-language processing (NLP) techniques using machine learning to analyze messaging interactions and generate user intent 515 based on the messaging interactions.

The interaction processing component 550 may interface with a natural-language machine learning (NLML) component 560. The NLML component 560 analyzes the contents of a messaging interaction to determine an intent of the messaging interaction. The intent represents a goal being sought by the messaging interaction. For instance, people discussing where to get dinner may have an intent of "dinning," "eating," "restaurant," or other related term. The interaction processing component 550 may provide the content of a messaging interaction, including one or more messages, to the NLML component 550 and the NLML component 550 replies with the user intent 515, or multiple user intents, it detects for that interaction. The NLML component 550 may be implemented using known natural language processing (NLP) and machine learning (ML) techniques.

The message queue monitoring component 540 monitors a messaging interaction. This messaging interaction is exchanged via a messaging system 140. This messaging interaction involving at least one client device, such as a sender client device 520 and/or a recipient client device 590. A message 510 may be sent from a client messaging component 526 of a messaging client on a sender client device 520. This message 510 is associated with a message thread, the message thread involving two or more participants, including the user of the sender client device 520. This message 510 comprises a portion of the messaging interaction of a message thread.

The message 510 is received by the messaging component 530 of the client front-end server 535 and is added to a message queue 580 associated with the sender. The message 510 is distributed using the message queue 580 to the recipient client device 590. The message queue monitoring component 540 also receives the message 510 and provides it to the interaction processing component 550.

The interaction processing component 550 provides the message 510 to the NLML component 560 and receives the user intent 515 in response. The message 510 may be provided to the NLML component 560 as part of a repository of multiple messages, so as to empower the analysis of a messaging interaction as a whole. As such, the interaction processing component 550 determines determine a user intent for the messaging interaction by submitting at least a portion of the messaging interaction to a NLML component 560 and receiving the user intent 515 from the NLML component 560 in response to submitting at least the portion of the messaging interaction to the NLML component 560. The interaction processing component 550 may therefore detect the user intent 515 for the messaging interaction by using the NLML component 560.

Figure 6:
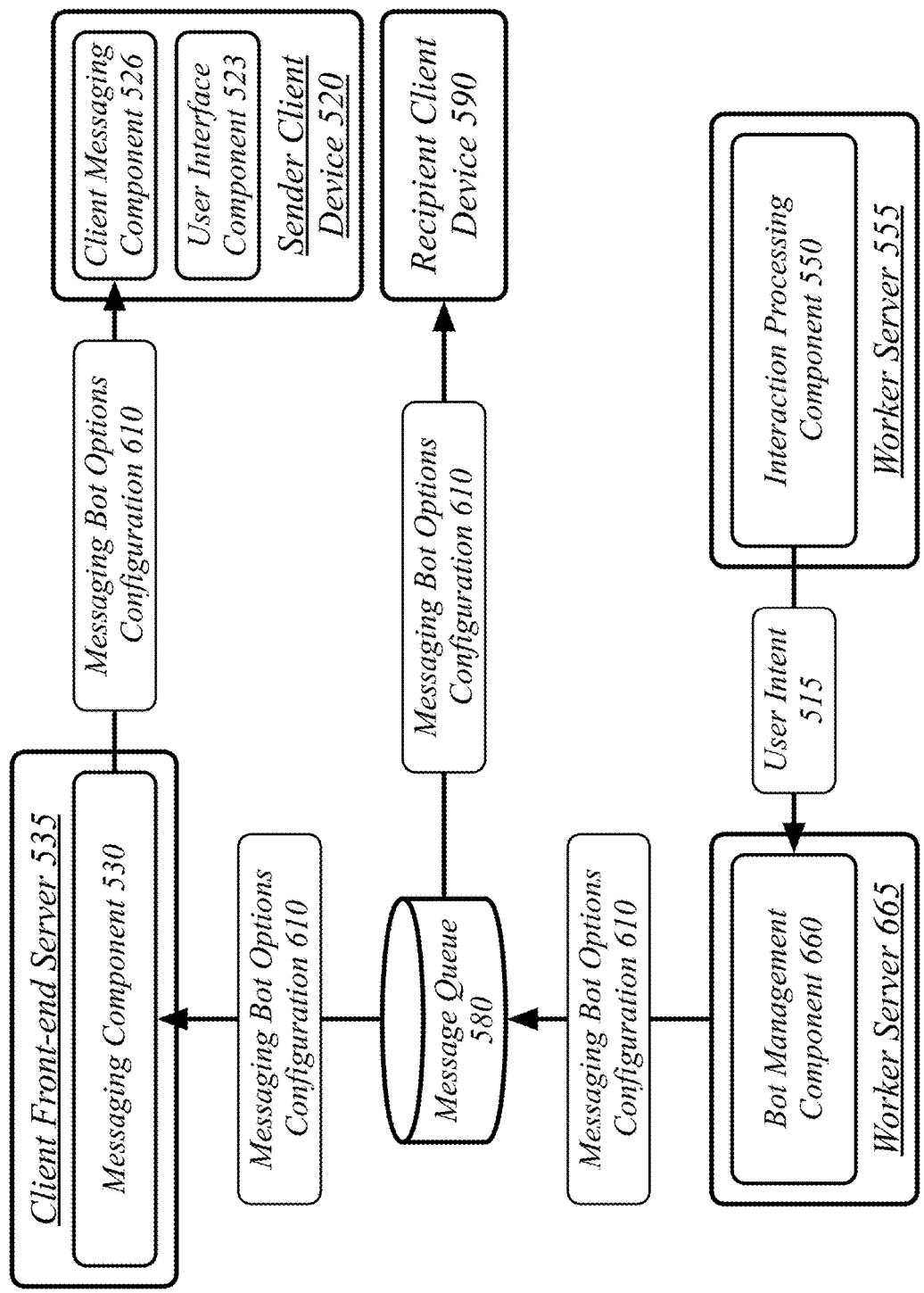
FIG. 6 illustrates a messaging bot options configuration based on a user intent.

FIG. 6 illustrates a messaging bot options configuration 610 based on a user intent 515.

In some embodiments, a consumer-to-business messaging system 100 may include a bot management component 660 that acts as an access point to messaging bot services for the consumer-to-business messaging system 100. The bot management component 660 may act as an intermediary between the servers of the messaging system 140 and one or more internal and/or external bot execution servers. The bot management component 660 may comprise a bot framework generally arranged to provide an accessible framework to the messaging bot system. The bot management component 660 may be executed by a worker server 665 substantially similar to the worker servers 545, 555, 565 described with reference to FIG. 5.

In some cases, messaging bots may be executed by servers external to the consumer-to-business messaging system 100, such as an external bot server operated by the service associated with the bot. A bot management component 660 may determine an external bot server for the service associated with the messaging bot. The bot management component 660 may submit messages to the messaging bot by sending the messages to the external bot server associated with the messaging bot. In some embodiments, submitting messages may comprise extracting message content and transmitting the message content to the external bot server using a bot server interaction application programming interface (API). Bot messages from the messaging bots may similarly be received by the bot management component 660 from an external bot server.

In other cases, messaging bots may be executed by the servers of the consumer-to-business messaging system 100. The bot management component 660 may determine a hosted bot server for the service associated with a messaging bot. A hosted bot server may comprise a bot server maintained by the provider of the consumer-to-business messaging system 100. The bot management component 660 may submit messages to the messaging bot by sending the messages to the hosted bot server associated with the messaging bot and may receive messages from the messaging bot by receiving them from the hosted bot server.

The bot management component 660 receives the user intent 515 from the interaction processing component 550 and determines a messaging bot options configuration 610 for the client device based on the user intent 515. The messaging bot options configuration 610 configures one or more client devices with interface controls empowering the one or more users of the one or more client devices to engage with one or more messaging bots.

The bot management component 660 then sends the messaging bot options configuration 610 to the sending client device 520 in response to the change in the context of the messaging interaction enacted by the message 510 being sent by the sender client device 520. Sending the messaging bot options configuration 610 to the sender client device 520 may comprise adding the messaging bot options configuration 610 to a message queue 580, such as a message queue 580 associated with a message thread in which the messaging interaction is occurring. The messaging bot options configuration is then distributed to the sender client device 520 by a server messaging component 530 retrieving the messaging bot options configuration 610 from the message queue 580 and delivering it to the client messaging component 526. The messaging bot options configuration 610 may be distributed to every user and client device involved in the messaging interaction, such as every client device belonging to every participant in the message thread. As such, a recipient client device 590 for the message 510 may also receive the messaging bot options configuration 610 generated in response to the message 510.

A messaging interaction comprises a plurality of exchanged messages. This plurality of exchanged messages includes a most-recent message 510 of the message interaction. A message package sent to the client device via the messaging component 530, with this message package associated with the most-recent message 510, may be used to deliver the messaging bot options configuration 610. A message package sent to the sender client device 510 may be used to confirm receipt of the message 510 by the messaging system 140, may be used to report delivery of the message 510 to one or more recipient users, and/or may be used to report that a recipient user has viewed the message 510. A message package sent to a recipient client device 590 may comprise both the message 510, as may be the initial delivery of the message 510 to the recipient client device 590. In either case, the message package may additionally include the messaging bot options configuration 610.

In general, the message 510 may be sent to every client device related to a message thread, including the client device used to send the message 510. This message 510 may be augmented in the package used to deliver the message 510 with the messaging bot options configuration 610. The messaging bot options configuration 610 configures the messaging interface for the messaging client in displaying a message thread with controls empowering interactions with a messaging bot. Therefore, the bot management component 660 is operative to send a message package to the client device, the message package associated with the most-recent message 510, such that the message package comprises the messaging bot options configuration 610. This message package updates the client device with the most-recent message 510. In some cases, this most-recent message 510 is received from a different client device than the one receiving the message package. In some cases, the message package 510 may acknowledge receipt of the most-recent message from the client device.

In some instances, the messaging bot options configuration 610 may be a messaging bot menu associated with a messaging bot. The messaging bot menu is customized based on the user intent 515. The messaging bot menu may consist of a plurality of user-customizable options. Customizing the messaging bot menu based on the user intent may consist of pre-filling one or more of the user-customizable options based on the user intent. The messaging bot menu may comprise a later stage or second stage of providing messaging bot options configurations to a client device, with a first stage being messaging bot options configurations and the second stage being a customized messaging bot menu provided in response to an activation of a messaging bot invocation control.

In some cases, customizing the messaging bot menu based on the user intent 515 may comprise selecting a menu section of the menu for display on the client device based on the user intent 515. A messaging bot menu may be divided into sections. For example, a messaging bot menu representing a food menu for a restaurant may have sections for different ingredients, kind of cuisine, or other considerations. In some cases, the restaurant may explicitly configure these sections when creating a messaging bot. In other cases, the restaurant may provide ingredient information (or, more generally, menu item information), with the consumer-to-business messaging system 100 generating the menu sections. A menu section may be automatically selected based on the context of the messaging interaction. For example, a user profile for a user may indicate that they are vegetarian or prefer vegetarian options. In response, the bot management component 660 may configure the messaging bot options configuration 610 to select a vegetarian menu section based on the user profile information. In another example, users discussing seeing a movie may be presented with a section for a movie ticket messaging bot, or other relevant messaging bot, that presents a specific movie being discussed, a type of movie being discussed, or otherwise relates to the discussion.

In some instances, the messaging bot options configuration 610 may consist of a plurality of messaging bot invocation controls. Each of the messaging bot invocation controls is associated with a different messaging bot. This plurality of messaging bot invocation controls is selected based on the user intent 515. The user intent 515 may reflect a user-expressed goal or subject of a messaging interaction. Various messaging bots may be associated with this user intent 515. For instance, messaging bots may be assigned one or more user intents during a registration with the consumer-to-business messaging system 100. A plurality of messaging bots associated with the user intent 515 are determined and provided to a client device. In some instances, the plurality of messaging bot invocation controls may be additionally selected based on a user context. A user context may consist of one or more of a user location and a local user time, without limitation. The plurality of messaging bot invocation controls may additionally be selected based on a user profile, such as based on user service preference information stored in the user profile.

After the delivery of a messaging bot options configuration 610 comprising messaging bot invocation controls, the user of the client device may select one of the messaging bot invocation controls. The messaging component 550 may then receive a user messaging bot selection of a selected messaging bot invocation control of the plurality of messaging bot invocation controls from the client device. A selected messaging bot invocation control is associated with a selected messaging bot. The user messaging bot selection is passed to the bot management component 660, which then sends a messaging bot interface to the client device in response. This messaging bot interface may comprise, in some instances, a messaging bot menu.

To process the messaging bot selection, the bot management component 660 sends a messaging bot invocation message to a bot server associated with the selected messaging bot. The messaging bot invocation message includes the user intent 515 to empower the messaging bot to configure itself according to the user intent 515. In some instances, the bot server may be hosted by the consumer-to-business messaging system 100. In other instances, the bot server may be externally hosted, such as by the developer of the messaging bot. The bot management component 660 then receives a messaging bot interface specification from the bot server in response to the messaging bot invocation message, where this messaging bot interface is based on the messaging bot interface specification.

A messaging bot interface may comprise a plurality of user-customizable options. The consumer-to-business messaging system 100 may receive one or more user option configurations for the plurality of user-customizable options based on a user configuration one or more user-customizable options. The consumer-to-business messaging system 100 may then receive a second user messaging bot selection of a second messaging bot invocation control of the plurality of messaging bot invocation controls from the client device, the second selected messaging bot invocation control associated with a second selected messaging bot distinct from the selected messaging bot. The consumer-to-business messaging system 100 then sends a second messaging bot interface to the client device in response to receiving the invocation of the selected messaging bot invocation control, the second messaging bot interface associated with the second selected messaging bot. The consumer-to-business messaging system 100 thereby transitions from displaying an interface for a first messaging bot to a second messaging bot. To ease this transition, the consumer-to-business messaging system 100 configures the second messaging bot interface based on the one or more user option configurations. Configuring the second messaging bot interface based on the one or more user option configurations thereby transitions the one or more user option configurations to the second messaging bot interface. This storage and application of the one or more user option configurations may be performed by either the user interface component 523 of the messaging client or by the bot management component 660, depending on the embodiment.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
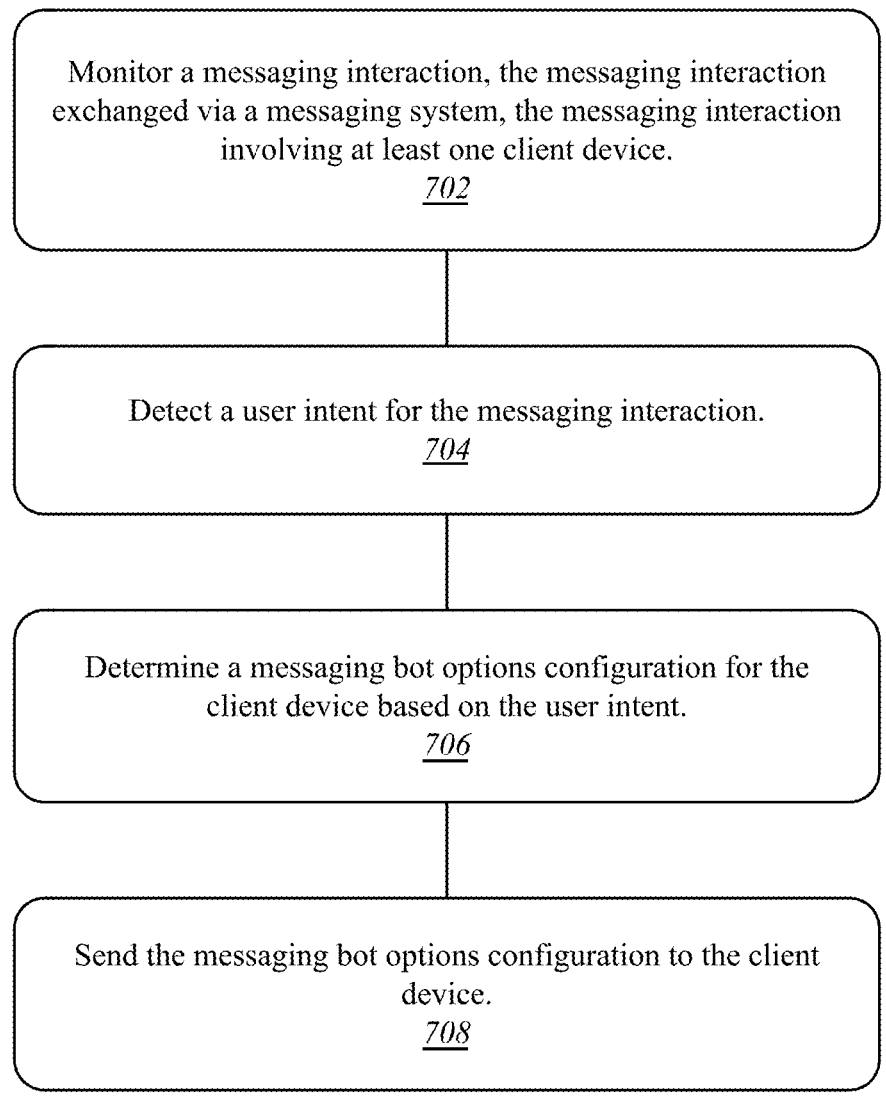
FIG. 7 illustrates an embodiment of a logic flow for the system of FIG. 1.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may monitor a messaging interaction, the messaging interaction exchanged via a messaging system, the messaging interaction involving at least one client device at block 702.

The logic flow 700 may detect a user intent for the messaging interaction at block 704.

The logic flow 700 may determine a messaging bot options configuration for the client device based on the user intent at block 706.

The logic flow 700 may send the messaging bot options configuration to the client device at block 708.

The embodiments are not limited to this example.

Figure 8:
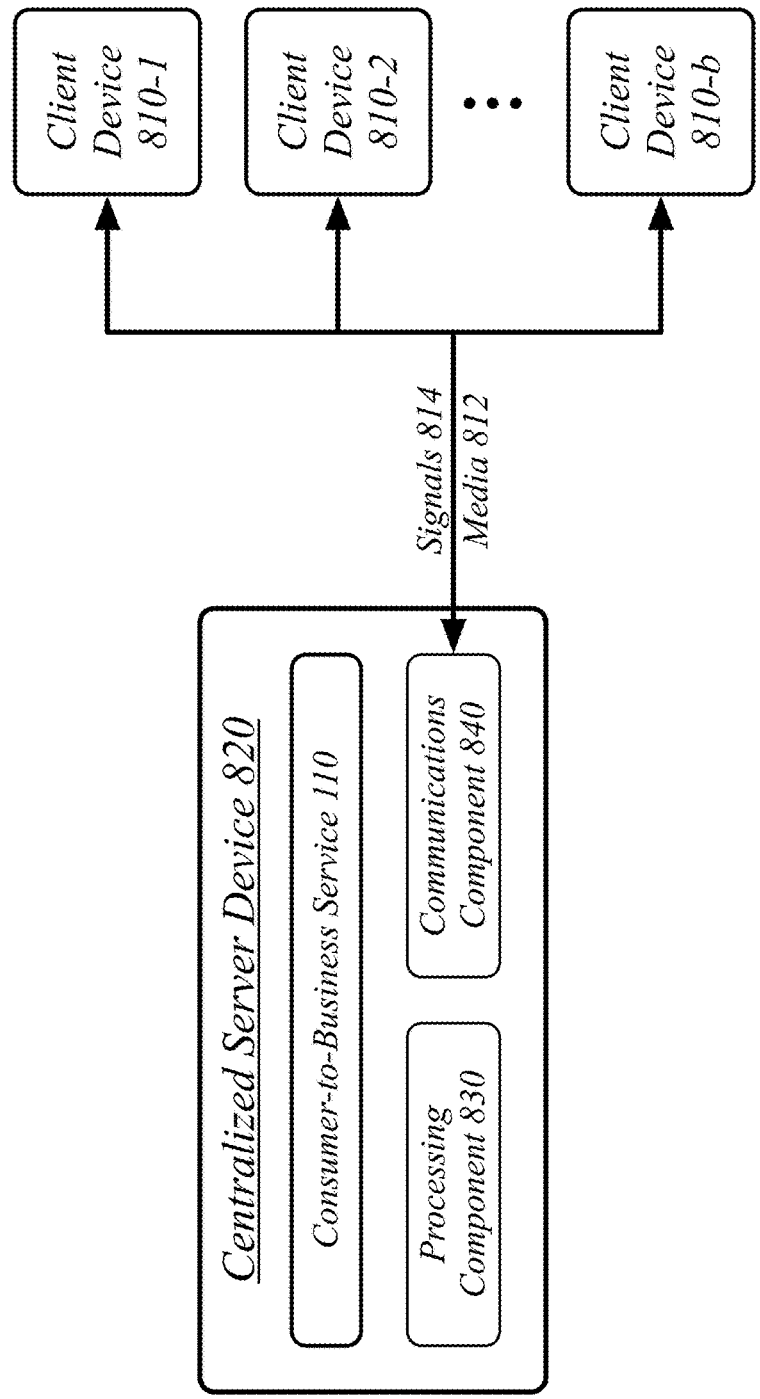
FIG. 8 illustrates an embodiment of a centralized system for the system of FIG. 1.

FIG. 8 illustrates a block diagram of a centralized system 800. The centralized system 800 may implement some or all of the structure and/or operations for the consumer-to-business messaging system 100 in a single computing entity, such as entirely within a single centralized server device 820.

The centralized server device 820 may comprise any electronic device capable of receiving, processing, and sending information for the consumer-to-business messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 820 may execute processing operations or logic for the consumer-to-business messaging system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 820 may execute communications operations or logic for the consumer-to-business messaging system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 820 may implement the consumer-to-business service 110 in a single computing entity. The centralized server device 820 may communicate with other devices over a communications media 812 using communications signals 814 via the communications component 840. The devices may be internal or external to the centralized server device 820 as desired for a given implementation. The centralized server device 820 may communicate with a plurality of client devices 810, such as may comprise the client device 120, client device 320, sender client device 520, recipient client device 590, or any other client device.

Figure 9:
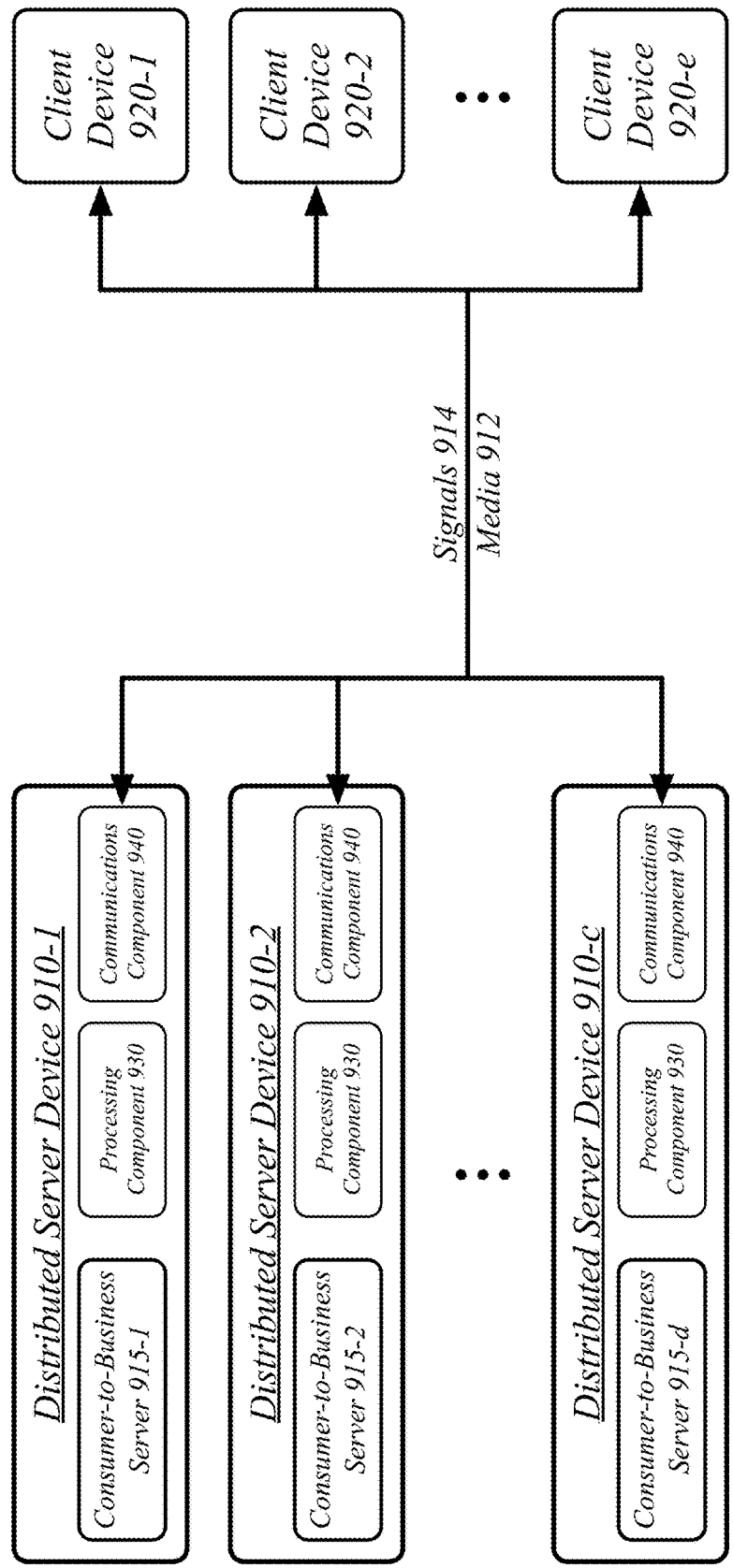
FIG. 9 illustrates an embodiment of a distributed system for the system of FIG. 1.

FIG. 9 illustrates a block diagram of a distributed system 900. The distributed system 900 may distribute portions of the structure and/or operations for the consumer-to-business messaging system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of distributed server devices 910. In general, the distributed server devices 910 may be the same or similar to the centralized server device 820 as described with reference to FIG. 8. For instance, the distributed server devices 910 may each comprise a processing component 930 and a communications component 940 which are the same or similar to the processing component 830 and the communications component 840, respectively, as described with reference to FIG. 8. In another example, the distributed server devices 910 may communicate over a communications media 912 using communications signals 914 via the communications components 940.

The distributed server devices 910 may comprise or employ one or more server programs that operate to perform various methodologies in accordance with the described embodiments. In one embodiment, for example, the distributed server devices 910 may each implement one or more consumer-to-business servers 915. The consumer-to-business servers 915 may collectively implement the consumer-to-business service 110 as a distributed computing entity. The consumer-to-business servers 915 may communicate with a plurality of client devices 920, such as may comprise the client device 120, client device 320, sender client device 520, recipient client device 590, client devices 810, or any other client device.

Figure 10:
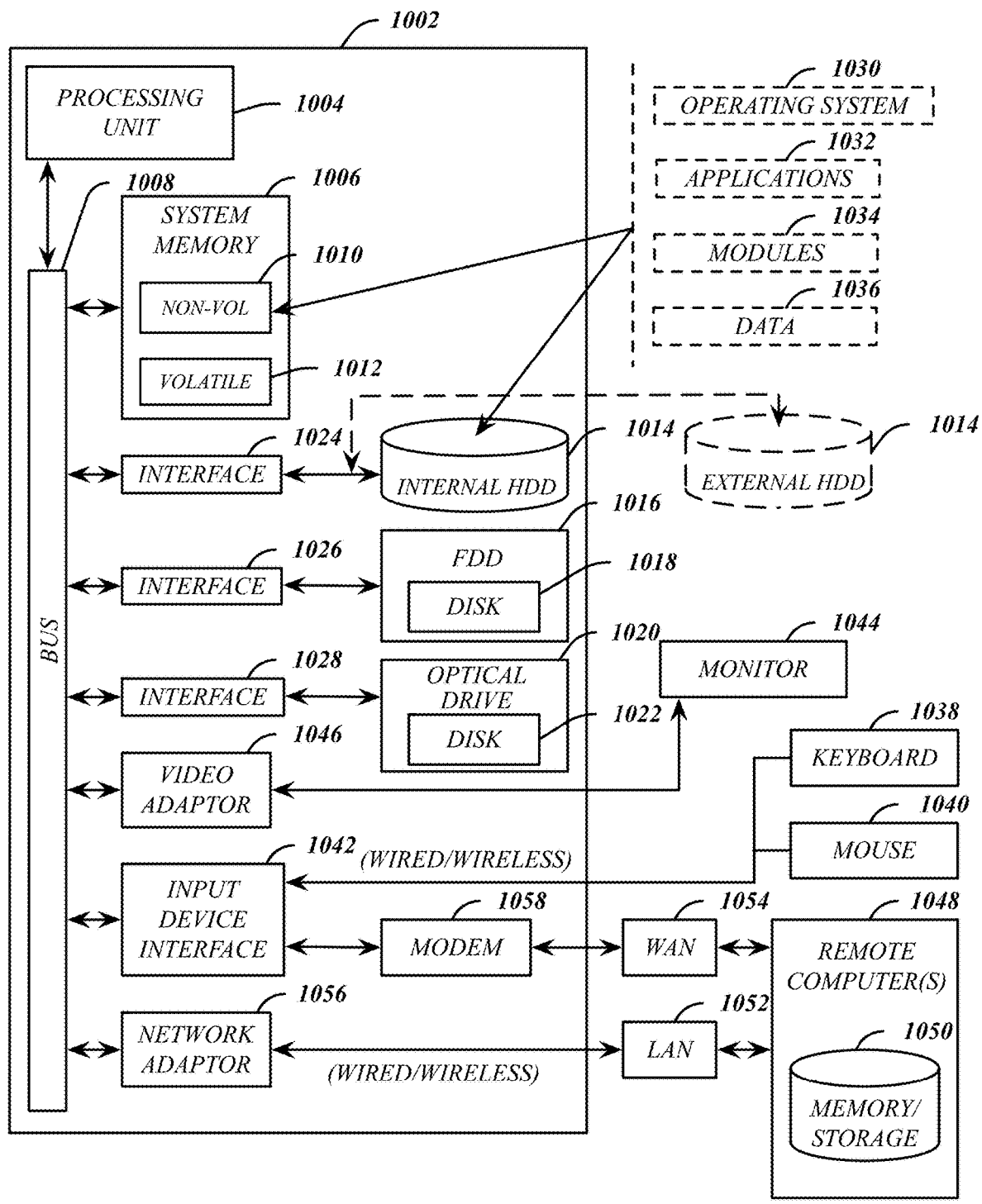
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the consumer-to-business messaging system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
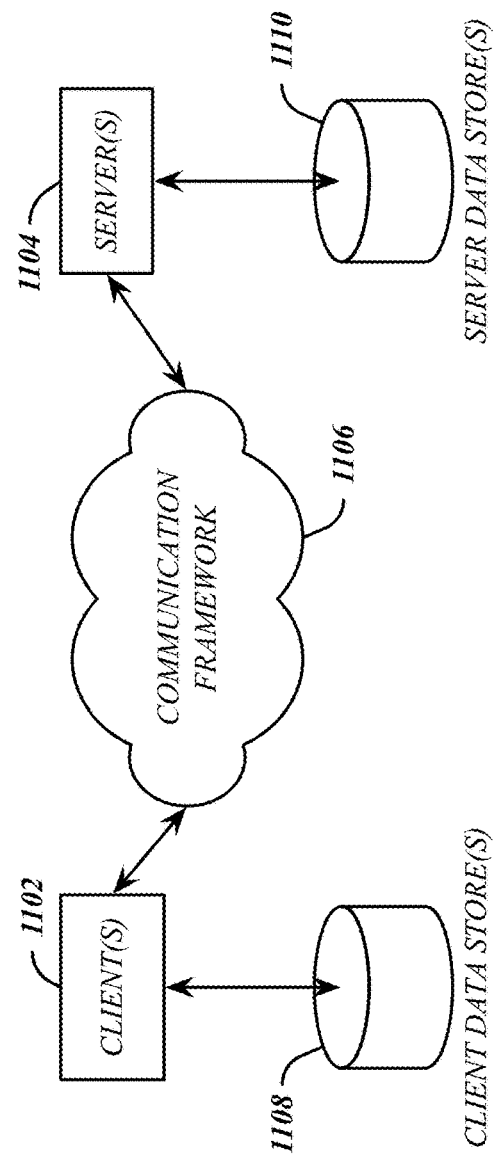
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may correspond to messaging clients, as may be executed by any of the client device 120, client device 320, sender client device 520, recipient client device 590, client devices 810, client devices 920, or any other client device. The servers 1104 may implement the consumer-to-business service 110, as may be distributed across one or more server devices. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
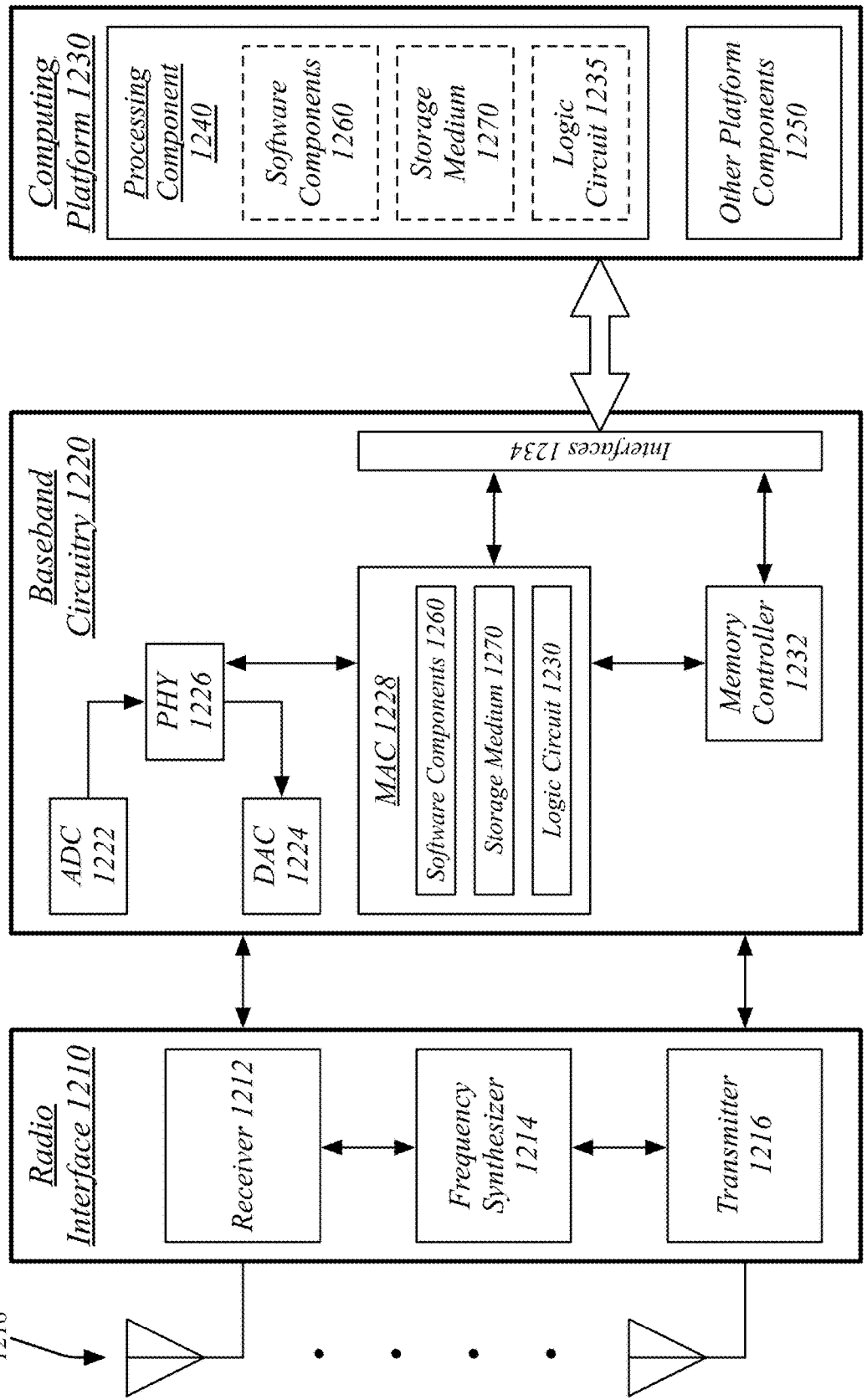
FIG. 12 illustrates an embodiment of a radio device architecture.

FIG. 12 illustrates an embodiment of a device 1200 for use in a multicarrier OFDM system, such as the consumer-to-business messaging system 100. Device 1200 may implement, for example, software components 1260 as described with reference to consumer-to-business messaging system 100 and/or a logic circuit 1235. The logic circuit 1235 may include physical circuits to perform operations described for the consumer-to-business messaging system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the consumer-to-business messaging system 100 and/or logic circuit 1235 in a single computing entity, such as entirely within a single device. Alternatively, the device 1200 may distribute portions of the structure and/or operations for the consumer-to-business messaging system 100 and/or logic circuit 1235 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the consumer-to-business messaging system 100 and logic circuit 1235 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise monitoring a messaging interaction, the messaging interaction exchanged via a messaging system, the messaging interaction involving at least one client device; detecting a user intent for the messaging interaction; determining a messaging bot options configuration for the client device based on the user intent; and sending the messaging bot options configuration to the client device.

A computer-implemented method may further comprise wherein detecting the user intent for the messaging interaction comprises: submitting at least a portion of the messaging interaction to a natural-language machine learning component; and receiving the user intent from the natural-language machine learning component in response to submitting at least the portion of the messaging interaction to the natural-language machine learning component.

A computer-implemented method may further comprise the messaging interaction comprising a plurality of exchanged messages, the plurality of exchanged messages comprising a most-recent message of the message interaction, further comprising: sending a message package to the client device, the message package associated with the most-recent message, the message package comprising the messaging bot options configuration.

A computer-implemented method may further comprise the message package updating the client device with the most-recent message, the most-recent message received from a different client device.

A computer-implemented method may further comprise the message package acknowledging receipt of the most-recent message from the client device.

A computer-implemented method may further comprise the messaging bot options configuration comprising a messaging bot menu associated with a messaging bot, wherein the messaging bot menu is customized based on the user intent.

A computer-implemented method may further comprise wherein the messaging bot menu comprises a plurality of user-customizable options, wherein customizing the messaging bot menu based on the user intent comprises pre-filling one or more of the user-customizable options based on the user intent.

A computer-implemented method may further comprise wherein customizing the messaging bot menu based on the user intent comprises selecting a menu section of the menu for display on the client device based on the user intent.

A computer-implemented method may further comprise the messaging bot options configuration comprising a plurality of messaging bot invocation controls, wherein each of the messaging bot invocation controls is associated with a different messaging bot, wherein the plurality of messaging bot invocation controls are selected based on the user intent.

A computer-implemented method may further comprise wherein the plurality of messaging bot invocation controls are additionally selected based on a user context.

A computer-implemented method may further comprise the user context comprising one or more of a user location and a local user time.

A computer-implemented method may further comprise wherein the plurality of messaging bot invocation controls are additionally selected based on a user profile, the user profile comprising user service preference information.

A computer-implemented method may further comprise receiving a user messaging bot selection of a selected messaging bot invocation control of the plurality of messaging bot invocation controls from the client device, the selected messaging bot invocation control associated with a selected messaging bot; and sending a messaging bot interface to the client device in response to receiving the invocation of the selected messaging bot invocation control.

A computer-implemented method may further comprise sending a messaging bot invocation message to a bot server associated with the selected messaging bot, the messaging bot invocation message comprising the user intent; and receiving a messaging bot interface specification from the bot server in response to the messaging bot invocation message, the messaging bot interface based on the messaging bot interface specification.

A computer-implemented method may further comprise the messaging bot interface comprising a plurality of user-customizable options, further comprising: receiving one or more user option configurations for the plurality of user-customizable options; receiving a second user messaging bot selection of a second messaging bot invocation control of the plurality of messaging bot invocation controls from the client device, the second selected messaging bot invocation control associated with a second selected messaging bot distinct from the selected messaging bot; sending a second messaging bot interface to the client device in response to receiving the invocation of the selected messaging bot invocation control, the second messaging bot interface associated with the second selected messaging bot; and configuring the second messaging bot interface based on the one or more user option configurations, wherein configuring the second messaging bot interface based on the one or more user option configurations transitions the one or more user option configurations to the second messaging bot interface.

An apparatus may comprise a processor circuit on a device; a message queue monitoring component operative on the processor circuit to monitor a messaging interaction, the messaging interaction exchanged via a messaging system, the messaging interaction involving at least one client device; an interaction processing component operative to determine a user intent for the messaging interaction; and a bot management component operative to determine a messaging bot options configuration for the client device based on the user intent; and send the messaging bot options configuration to the client device. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   monitoring a messaging interaction, the messaging interaction exchanged via a messaging system, the messaging interaction involving at least one client device;
   submitting one or more messages from the messaging interaction to a natural language machine learning processor;
   receiving, from the natural language machine learning processor, one or more user intents based on the one or more messages;
   determining a messaging bot options configuration for the client device, the messaging bot options configuration comprising a plurality of messaging bot invocation controls for display in a messaging application on the client device, wherein each of the messaging bot invocation controls is associated with a different messaging bot related one or more of the user intents;
   sending the messaging bot options configuration to the client device;
   receiving a user selection of one of the messaging bot invocation controls; and
   sending a message bot interface to the client device for the messaging bot indicated by the selected messaging bot invocation control.

2. The method of claim 1, the messaging bot options configuration comprising a messaging bot menu associated with a messaging bot, wherein the messaging bot menu is customized based on the user intent.

3. The method of claim 2, wherein the messaging bot menu comprises a plurality of user-customizable options, wherein customizing the messaging bot menu based on the user intent comprises pre-filling one or more of the user-customizable options based on the user intent.

4. The method of claim 2, wherein customizing the messaging bot menu based on the user intent comprises selecting a menu section of the menu for display on the client device based on the user intent.

5. The method of claim 1 further comprising:
   sending a messaging bot invocation message to a bot server associated with the selected messaging bot, the messaging bot invocation message comprising the user intent; and
   receiving a messaging bot interface specification from the bot server in response to the messaging bot invocation message, the messaging bot interface based on the messaging bot interface specification.

6. The method of claim 1, the messaging bot interface comprising a plurality of user-customizable options, further comprising:
   receiving one or more user option configurations for the plurality of user-customizable options;
   receiving a second user messaging bot selection of a second messaging bot invocation control of the plurality of messaging bot invocation controls from the client device, the second selected messaging bot invocation control associated with a second selected messaging bot distinct from the selected messaging bot;
   sending a second messaging bot interface to the client device in response to receiving the invocation of the selected messaging bot invocation control, the second messaging bot interface associated with the second selected messaging bot; and configuring the second messaging bot interface based on the one or more user option configurations, wherein configuring the second messaging bot interface based on the one or more user option configurations transitions the one or more user option configurations to the second messaging bot interface.

7. An apparatus, comprising:
a processor circuit on a device;
a message queue monitoring component operative on the processor circuit to:
  monitor a messaging interaction, the messaging interaction exchanged via a messaging system, the messaging interaction involving at least one client device;
an interaction processing component operative to:
  submit one or more messages from the messaging interaction to a natural language machine learning processor;
  receive, from the natural language machine learning processor, one or more user intents based on the one or more messages; and
a bot management component operative to:
  determine a messaging bot options configuration for the client device, the messaging bot options configuration comprising a plurality of messaging bot invocation controls for display in a messaging application on the client device, wherein each of the messaging bot invocation controls is associated with a different messaging bot related one or more of the user intents;
  send the messaging bot options configuration to the client device;
  receive a user selection of one of the messaging bot invocation controls; and
  send a message bot interface to the client device for the messaging bot indicated by the selected messaging bot invocation control.

8. The apparatus of claim 7, the messaging bot options configuration comprising a messaging bot menu associated with a messaging bot, wherein the messaging bot menu is customized based on the user intent, wherein the messaging bot menu comprises a plurality of user-customizable options, wherein customizing the messaging bot menu based on the user intent comprises pre-filling one or more of the user-customizable options based on the user intent.

9. The apparatus of claim 7, the messaging bot options configuration comprising a messaging bot menu associated with a messaging bot, wherein the messaging bot menu is customized based on the user intent, wherein customizing the messaging bot menu based on the user intent comprises selecting a menu section of the menu for display on the client device based on the user intent.

10. The apparatus of claim 7, further comprising:
the bot management component operative to send a messaging bot invocation message to a bot server associated with the selected messaging bot, the messaging bot invocation message comprising the user intent; and receive a messaging bot interface specification from the bot server in response to the messaging bot invocation message, the messaging bot interface based on the messaging bot interface specification.

11. The apparatus of claim 7, the messaging bot interface comprising a plurality of user-customizable options, further comprising:

the bot management component operative to receive one or more user option configurations for the plurality of user-customizable options; receive a second user messaging bot selection of a second messaging bot invocation control of the plurality of messaging bot invocation controls from the client device, the second selected messaging bot invocation control associated with a second selected messaging bot distinct from the selected messaging bot; send a second messaging bot interface to the client device in response to receiving the invocation of the selected messaging bot invocation control, the second messaging bot interface associated with the second selected messaging bot; and configure the second messaging bot interface based on the one or more user option configurations, wherein configuring the second messaging bot interface based on the one or more user option configurations transitions the one or more user option configurations to the second messaging bot interface.

12. A non-transitory computer-readable storage medium comprising instructions that, when executed, cause a system to:
  monitor a messaging interaction, the messaging interaction exchanged via a messaging system, the messaging interaction involving at least one client device;
    submit one or more messages from the messaging interaction to a natural language machine learning processor;
    receive, from the natural language machine learning processor, one or more user intents based on the one or more messages;
  determine a messaging bot options configuration for the client device, the messaging bot options configuration comprising a plurality of messaging bot invocation controls for display in a messaging application on the client device, wherein each of the messaging bot invocation controls is associated with a different messaging bot related one or more of the user intents
  send the messaging bot options configuration to the client device;
  receive a user selection of one of the messaging bot invocation controls; and
  send a message bot interface to the client device for the messaging bot indicated by the selected messaging bot invocation control.

13. The computer-readable storage medium of claim 12, the messaging bot options configuration comprising a messaging bot menu associated with a messaging bot, wherein the messaging bot menu is customized based on the user intent, wherein the messaging bot menu comprises a plurality of user-customizable options, wherein customizing the messaging bot menu based on the user intent comprises pre-filling one or more of the user-customizable options based on the user intent.

14. The computer-readable storage medium of claim 12, the messaging bot options configuration comprising a messaging bot menu associated with a messaging bot, wherein the messaging bot menu is customized based on the user intent, wherein customizing the messaging bot menu based on the user intent comprises selecting a menu section of the menu for display on the client device based on the user intent.

15. The computer-readable storage medium of claim 12, comprising further instructions that, when executed, cause a system to:

send a messaging bot invocation message to a bot server associated with the selected messaging bot, the messaging bot invocation message comprising the user intent; and receive a messaging bot interface specification from the bot server in response to the messaging bot invocation message, the messaging bot interface based on the messaging bot interface specification.

16. The computer-readable storage medium of claim 12, the messaging bot interface comprising a plurality of user-customizable options, comprising further instructions that, when executed, cause a system to:

receive one or more user option configurations for the plurality of user-customizable options;

receive a second user messaging bot selection of a second messaging bot invocation control of the plurality of messaging bot invocation controls from the client device, the second selected messaging bot invocation control associated with a second selected messaging bot distinct from the selected messaging bot;

send a second messaging bot interface to the client device in response to receiving the invocation of the selected messaging bot invocation control, the second messaging bot interface associated with the second selected messaging bot; and configure the second messaging bot interface based on the one or more user option configurations, wherein configuring the second messaging bot interface based on the one or more user option configurations transitions the one or more user option configurations to the second messaging bot interface.

* * * * *